United States Patent
Scalise et al.

(10) Patent No.: US 10,755,723 B1
(45) Date of Patent: Aug. 25, 2020

(54) SHARED AUDIO FUNCTIONALITY BASED ON DEVICE GROUPING

(71) Applicant: AMAZON TECHNOLOGIES, INC., Seattle, WA (US)

(72) Inventors: Albert M Scalise, San Jose, CA (US); Tony David, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 77 days.

(21) Appl. No.: 15/914,721

(22) Filed: Mar. 7, 2018

Related U.S. Application Data

(63) Continuation of application No. 14/227,227, filed on Mar. 27, 2014, now Pat. No. 9,916,839.

(51) Int. Cl.
*G10L 21/00* (2013.01)

(52) U.S. Cl.
CPC .................................. *G10L 21/00* (2013.01)

(58) Field of Classification Search
None
See application file for complete search history.

(56) References Cited

U.S. PATENT DOCUMENTS

| | | | |
|---|---|---|---|
| 7,577,757 B2 * | 8/2009 | Carter | H04L 29/06027 707/999.201 |
| 8,340,975 B1 | 12/2012 | Rosenberger | |
| 2005/0038660 A1 | 2/2005 | Black et al. | |
| 2008/0075417 A1 | 3/2008 | Mizuno | |
| 2008/0207115 A1 | 8/2008 | Lee et al. | |
| 2008/0235580 A1 | 9/2008 | Gonze et al. | |
| 2009/0007198 A1 | 1/2009 | Lavender et al. | |
| 2010/0228547 A1 | 9/2010 | Scott et al. | |
| 2011/0218656 A1 | 9/2011 | Bishop et al. | |
| 2012/0062370 A1 | 3/2012 | Feldstein et al. | |
| 2012/0092377 A1 | 4/2012 | Stein | |
| 2012/0214544 A1 | 8/2012 | Shivappa et al. | |
| 2012/0233765 A1 | 9/2012 | Altman et al. | |
| 2012/0297438 A1 | 11/2012 | Kline | |
| 2013/0183944 A1 | 7/2013 | Mozer et al. | |
| 2014/0037107 A1 * | 2/2014 | Marino, Jr. | H03G 3/10 381/107 |
| 2014/0100854 A1 | 4/2014 | Chen et al. | |

(Continued)

OTHER PUBLICATIONS

Harris, Keara S., "Final Office Action dated Nov. 18, 2015", U.S. Appl. No. 14/227,099, The United States Patent and Trademark Office, dated Nov. 18, 2015.

(Continued)

*Primary Examiner* — Kevin Ky
(74) *Attorney, Agent, or Firm* — Lindauer Law, PLLC

(57) ABSTRACT

Techniques are described for shared audio functionality between multiple computing devices, based on identifying computing devices in a device set. The devices may provide audio output, audio input, or both audio output and input. The devices may be organized into one or more device sets based on location, supported functions, or other criteria. The shared audio functionality may enable a voice command received at one device to be employed for controlling audio output or other operations of other device(s) in the device set. Shared audio functionality between devices may also enable synchronized audio output through using multiple devices.

20 Claims, 17 Drawing Sheets

(56) References Cited

U.S. PATENT DOCUMENTS

2014/0157430 A1 6/2014 McDowell-White et al.
2015/0154976 A1* 6/2015 Mutagi ................ H04L 12/281
                                                          704/275

OTHER PUBLICATIONS

Harris, Keara S., "Non-Final Office Action dated Jun. 4, 2015", U.S. Appl. No. 14/227,099, The United States Patent and Trademark Office, dated Jun. 4, 2015.

Harris, Keara S., "Notice of Allowance dated Mar. 11, 2016", U.S. Appl. No. 14/227,099, The United States Patent and Trademark Office, dated Mar. 11, 2016.

Harris, Keara S., "Notice of Allowance dated May 6, 2016", U.S. Appl. No. 14/227,099, The United States Patent and Trademark Office, dated May 6, 2016.

Jackson, Daryl L., "Advisory Action dated Apr. 22, 2016", U.S. Appl. No. 14/227,227, The United States Patent and Trademark Office, dated Apr. 22, 2016.

Jackson, Daryl L., "Final Office Action dated Feb. 12, 2016", U.S. Appl. No. 14/227,227, The United States Patent and Trademark Office, Feb. 12, 2016.

Jackson, Daryl L., "Non-Final Office Action dated Jul. 7, 2015", U.S. Appl. No. 14/227,227, The United States Patent and Trademark Office, dated Jul. 7, 2015.

Ky, Kevin, "Final Office Action dated Jan. 13, 2017", U.S. Appl. No. 14/227,227, The United States Patent and Trademark Office, dated Jan. 13, 2017.

Ky, Kevin, "Non-Final Office Action dated Jun. 12, 2017", U.S. Appl. No. 14/227,227, The United States Patent and Trademark Office, dated Jun. 12, 2017.

Ky, Kevin, "Non-final Office Action dated Jun. 15, 2016", U.S. Appl. No. 14/227,227, The United States Patent and Trademark Office, dated Jun. 15, 2016.

Ky, Kevin, "Notice of Allowance dated Nov. 3, 2017", U.S. Appl. No. 14/227,227, The United States Patent and Trademark Office, dated Nov. 3, 2017.

Ky, Kevin, "Advisory Action dated Mar. 22, 2017", U.S. Appl. No. 14/227,227, The United States Patent and Trademark Office, dated Mar. 22, 2017.

* cited by examiner

800

DEVICE SET INFORMATION
624(1)

| DEVICE SET DESCRIPTION 802 |||| 
|---|---|---|---|
| LIST OF INCLUDED DEVICES 804 |||| 
| DEVICE IDENTIFIER 806(1) | DEVICE NAME 808(1) | LOCATION 810(1) | SUPPORTED FUNCTIONS 812(1) |
| DEVICE IDENTIFIER 806(2) | DEVICE NAME 808(2) | LOCATION 810(2) | SUPPORTED FUNCTIONS 812(2) |
| DEVICE IDENTIFIER 806(3) | DEVICE NAME 808(3) | LOCATION 810(3) | SUPPORTED FUNCTIONS 812(3) |

⋮

DEVICE SET INFORMATION
624(2)

DEVICE SET INFORMATION
624(3)

EXAMPLE DEVICE SET INFORMATION 624

```
<device_set>
    <device_set_description>audio output devices</device_set_description>
    <device_list>
        <device id=12345 name=speaker0 location="living room" functions=audio_output>
        <device id=22345 name=speaker1 location="office" functions=audio_output>
        <device id=32345 name=speaker2 location="living room" functions=audio_output>
        <device id=42345 name=speaker3 location="living room" functions=audio_output>
        <device id=52345 name=speaker4 location="living room" functions=audio_output; stereo_audio_output>
        <device id=86753 name=tablet13 functions=audio_output; voice_input>
        <device id=86723 name=settopbox11 location="living room" functions=audio_output; voice_input; video_output>
        <device id=86773 name=settopbox18 location=master bedroom" functions=audio_output; voice_input; video_output>
        <device id=86754 name=audioio7 location="living room" functions=audio_output; voice_input>
        <device id=86757 name=audioio8 location="living room" functions=audio_output; voice_input>
    </device_list>
</device_set>

<device_set>
    <device_set_description>living room audio output devices</device_set_description>
    <device_list>
        <device id=12345 name=speaker0 location="living room" functions=audio_output>
        <device id=32345 name=speaker2 location="living room" functions=audio_output>
        <device id=42345 name=speaker3 location="living room" functions=audio_output>
        <device id=52345 name=speaker4 location="living room" functions=audio_output; stereo_audio_output>
        <device id=86723 name=settopbox11 location="living room" functions=audio_output; voice_input; video_output>
        <device id=86754 name=audioio7 location="living room" functions=audio_output; voice_input>
        <device id=86757 name=audioio8 location="living room" functions=audio_output; voice_input>
    </device_list>
</device_set>
    ⋮
```

FIG. 9

EXAMPLE DEVICE SET
INFORMATION
624

```
<device_set>
    <device_set_description>living room audio output devices for home theater</device_set_description>
    <device_list>
        <device id=12345 name=speaker0 location="living room" functions=audio_output>
        <device id=42345 name=speaker3 location="living room" functions=audio_output>
        <device id=52345 name=speaker4 location="living room" functions=audio_output; stereo_audio_output>
        <device id=86723 name=settopbox11 location="living room" functions=audio_output; voice_input; video_output>
        <device id=86754 name=audioio7 location="living room" functions=audio_output; voice_input>
    </device_list>
</device_set>

<device_set>
    <device_set_description>living room audio output devices for home theater rear channel</device_set_description>
    <device_list>
        <device id=52345 name=speaker4 location="living room" functions=audio_output; stereo_audio_output>
        <device id=86754 name=audioio7 location="living room" functions=audio_output; voice_input>
    </device_list>
</device_set>

<device_set>
    <device_set_description>living room audio output devices for home theater left channel</device_set_description>
    <device_list>
        <device id=12345 name=speaker0 location="living room" functions=audio_output>
        <device id=86723 name=settopbox11 location="living room" functions=audio_output; voice_input; video_output>
    </device_list>
</device_set>
    ⋮
```

FIG. 10

EXAMPLE DEVICE SET
INFORMATION
624

1100

```
<device_set>
   <device_set_description>living room audio output devices for home theater right channel</device_set_description>
   <device_list>
      <device id=42345 name=speaker3 location="living room" functions=audio_output>
   </device_list>
</device_set>

<device_set>
   <device_set_description>audio input devices</device_set_description>
   <device_list>
      <device id=86753 name=tablet13 functions=audio_output; voice_input>
      <device id=86753 name=settopbox11 location="living room" functions=audio_output; voice_input; video_output>
      <device id=86753 name=settopbox18 location=master bedroom" functions=audio_output; voice_input>
      <device id=86754 name=audioio7 location="living room" functions=audio_output; voice_input>
      <device id=86757 name=audioio8 location="living room" functions=audio_output; voice_input>
      <device id=12753 name=audioinput3 location="living room" functions=voice_input>
      <device id=12755 name=audioinput5 location="office" functions=voice_input>
      <device id=12752 name=audioinput2 location="master bedroom" functions=voice_input>
      <device id=12759 name=audioinput9 location="kitchen" functions=voice_input>
   </device_list>
</device_set>
```

SHARED AUDIO FUNCTIONALITY BASED ON DEVICE GROUPING

BACKGROUND

In a building automation environment, a centralized computing device may control multiple components such as appliances, security locks, alarm systems, and heating, ventilation, and air conditioning (HVAC) services. Because the components in a traditional automation environment may support different communications protocols, different data storage formats, different executable software, and so forth, the configuration of the controlling computing device may be specific to the particular environment and its components. Moreover, traditional automation environments may include environment-specific wiring and custom hardware components. For these reasons, existing building automation environments may require customized, expert setup and maintenance that may be beyond the capability of the average end user.

BRIEF DESCRIPTION OF THE DRAWINGS

FIG. 8 depicts a schematic illustrating device set information that may specify one or more device sets, each device set including a plurality of audio enabled devices that are grouped for shared audio functionality.

FIG. 9 depicts a schematic illustrating a first example of device set information that describes multiple device sets.

FIG. 10 depicts a schematic illustrating a second example of device set information that describes multiple device sets.

FIG. 11 depicts a schematic illustrating a third example of device set information that describes multiple device sets.

Figure 1:
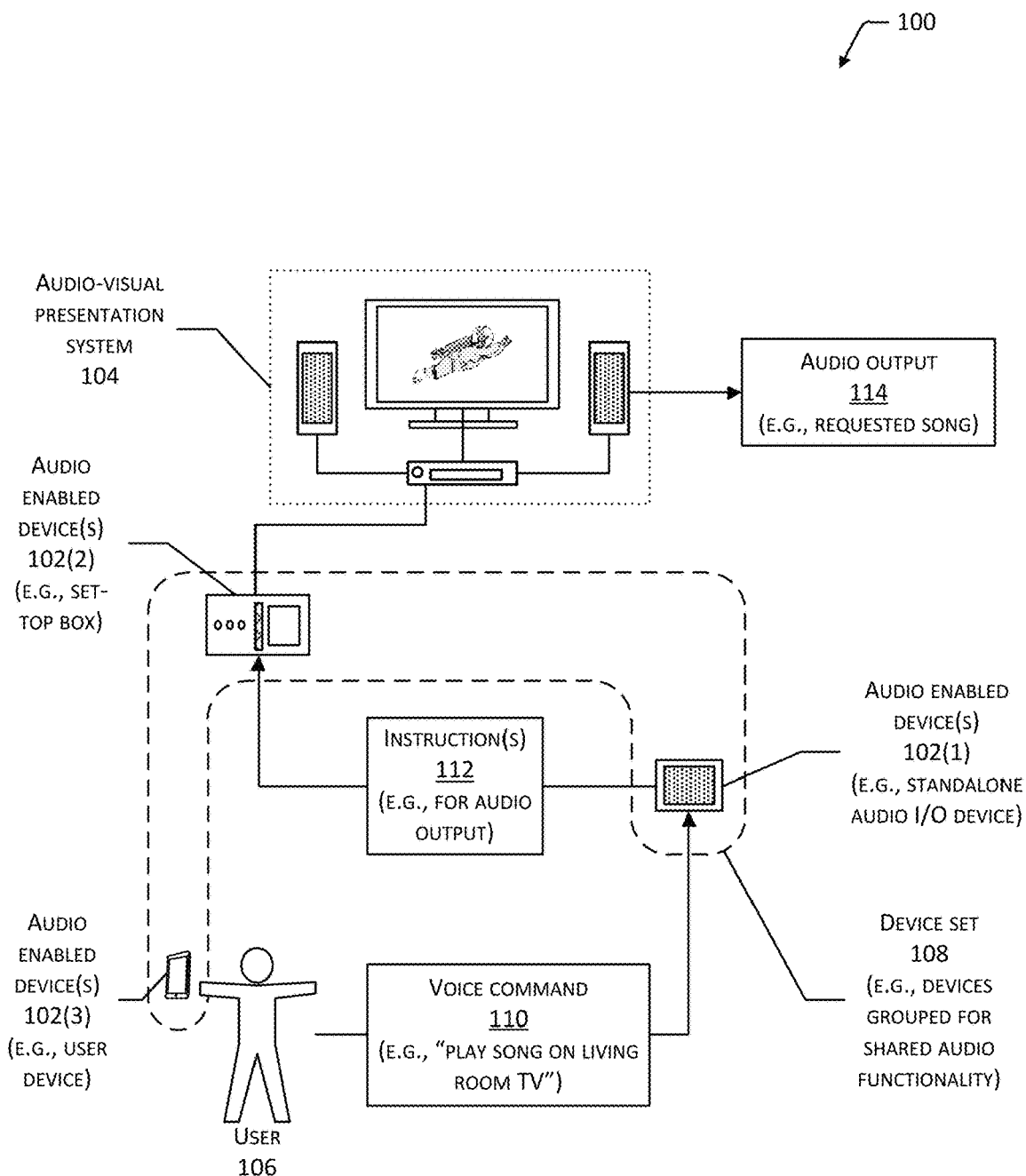
FIG. 1 depicts an environment including a plurality of audio enabled devices grouped into a device set for shared audio functionality such as shared audio output or shared audio input.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for designating a device set that includes a plurality of audio enabled devices and that enables shared functionality, such as shared audio functionality, between the plurality of audio enabled devices. In some implementations, the device set may enable shared audio functionality that includes shared audio output between multiple audio enabled devices, such that the same audio output is played in parallel on multiple audio enabled devices or played at different times on different audio enabled devices. In such cases, a voice command may identify a device set on which audio content is to be played (e.g., "play favorite songs in living room"). Device set information may then be accessed to determine the audio enabled devices that are included in the identified device set (e.g., living room audio playback devices), and the requested audio content may be played on the audio enabled devices of the device set. A device set may also enable shared audio functionality that includes shared audio input, such that a voice command or other audio input received at a receiving audio enabled device may be employed to control audio output or other operations performed by one or more target devices. For example, a voice command "play random classical music in the bedroom" may be received and processed by an audio enabled device in a different room (e.g., the living room). The audio enabled device that receives the voice command may then cause the specified device set (e.g., bedroom audio playback devices) to play the specified audio content.

In some implementations, a device set may determine whether shared functionality is authorized between devices. For example, a voice command may be received at a first audio enabled device, the voice command specifying audio content to be played on a second audio enabled device. If the first and second audio enabled devices are included in the same device set, the first audio enabled device may be configured to send one or more instructions to the second audio enabled device to instruct the second audio enabled device to play the requested audio content.

In some implementations, a receiving device may receive a voice command or other audio input from a user, the voice command identifying one or more target audio enabled devices and describing audio content to be played on the target audio enabled devices. The voice command may specify audio content as one or more particular audio files, such as particular songs, albums, tracks, and so forth (e.g., "play track 3 from album Y", "play songX", etc.). The voice command may also specify audio content as a named collection of audio content, such as a curated playlist, favorites list, and so forth (e.g., "play my new year's eve party mix", "play favorites list", "play random selection of my music", etc.). The audio content may also be specified as a category or class of audio content (e.g., "play jazz", "play top 100 rated songs", etc.), or according to a particular artist who composed or recorded the audio content (e.g., "play Mozart", "play songs by ArtistM", etc.). The voice command may identify one or more target audio enabled devices on which the audio content is to be played (e.g., "play jazz through living room set top box"). Alternatively, the voice command may identify a target device set that includes a plurality of target audio enabled devices on which the audio content is to be played (e.g., "play songX through whole house audio output devices"). In some cases, the voice command may specify different audio content to be played on multiple audio enabled devices (e.g., "play songX in living room and play songY in master bedroom").

The voice command may be analyzed by a speech recognition module executing on the receiving device, or by a speech recognition module executing on one or more distributed computing devices. Based on the analysis of the voice command, one or more instructions may be determined to instruct the target audio enabled devices to perform the operation specified in the voice command. The instructions may then be sent to each of the target audio enabled devices to instruct the target audio enabled devices to perform the operation. Shared functionality between the receiving device and the target audio enabled devices may include, but is not limited to, one or more of the following examples.

A voice command received at the receiving device may specify audio content to be played on a single target audio enabled device. In some cases, the target audio enabled device may be configured to provide an audio output function but may not be configured to provide an audio input function or may be too far away to receive the voice command. In such cases, the shared audio functionality may enable the target audio enabled device to be controlled via the voice command received at the receiving device.

A voice command received at the receiving device may specify audio content to be played on a plurality of target audio enabled devices included in a target device set. The plurality of target audio enabled devices may be specified to include the receiving device, or may not include the receiving device. In some cases, the audio content may be played in parallel (e.g., substantially synchronously or simultaneously) on the plurality of target audio enabled devices. Alternatively, the audio content may be played progressively at different times on different ones of the plurality of target audio enabled devices. For example, in the voice command a user may specify that the audio playback is to follow her as she moves from room to room in her house, and different target audio enabled device(s) may play the audio content based on the location of the user in the house.

A voice command received at the receiving device may specify other types of operations to be performed by one or more target audio enabled devices. For example, a voice command may specify that the target audio enabled device(s) are to activate, deactivate, sleep, shutdown, or perform other operations. In cases where the target audio enabled device(s) are not configured to provide an audio input function, the shared audio functionality may enable the target audio enabled device(s) to be controlled via voice command(s) processed by the receiving device.

A device set may be employed to determine whether the receiving device may control the operations of the target device based on the received voice command. In some implementations, a first device may detect a presence of a second device through a signal transmitted by the second device and received at the first device. In some cases, the signal may be a radio frequency signal arranged according to a version of an Institute of Electrical and Electronics Engineers (IEEE) 802.11 standard. The signal may also be a radio frequency signal arranged according to a version of the Bluetooth wireless standard managed by the Bluetooth Special Interest Group (SIG). Implementations also support other types of signals to determine a presence of device(s), including but not limited to electromagnetic signals in any frequency range (e.g., infrared, optical light), sonic signals in any frequency range (e.g., audible sounds, infrasonic sounds, ultrasonic sounds, etc.), and so forth.

The signal may include device identification information that identifies the second device, such as a device name, media access control (MAC) address, Internet Protocol (IP) address, and so forth. Based on the strength of the signal or other information, the first device may determine a distance between the first device and the second device, or a location of the first device relative to some other reference point. For example, a determination may be made that the second device is three meters from the first device, or that the first and second devices are both in a same house, same room, same portion of a room, and so forth.

Based on the first and second devices being within a threshold distance of each other, a device set may be designated to include the first and second devices. The designation of a device set may also be based on other criteria. Implementations support the designation of a device set based on criteria including, but not limited to, one or more of the following.

A device set may be designated based on a relative location, distance, or orientation of devices relative to one another. For example, a device set may be designated to include devices within radio signal range of one another, or within a predetermined threshold distance (e.g., ten meters) of one another.

A device set may be designated based on an absolute location of devices. For example, a device set may be designated to include devices that are located within a same region, locale, structure, or portion of a structure, such as in a same house or a same room of a house.

A device set may be designated based on a supported function of the devices. For example, a device set may be designated to include devices that provide an audio output function through audio output components (e.g., speakers), or to include devices that provide an audio input function for accepting voice commands through audio input components (e.g., microphones).

A device set may be designated based on the ownership, use, or other association of the devices with a same user or group of users. For example, a device set may be designated to include devices that are associated with Jane's user account, or to include devices that are associated with members of the Jones family.

A user account may include an account that the user has established and maintains with a network service provider, an online media provider (e.g., of streaming or downloadable audio or video), an online merchant, or another type of service provider. A user account may also include an account that the user employs to access one or more computing devices (e.g., the audio enabled device(s)) individually, or to access an administrative or network domain that controls access to one or more computing devices. The user account may be a login that the user employs to access one or more services or devices. In some cases, the user account may be associated with a password, security certificate, security tokens, or other credentials that may be employed to authenticate the user during a request for access to one or more services or devices.

On determining that the first and second devices meet the criteria for inclusion in a device set, device set information may be updated to indicate that the first and second devices are members of a device set. In some implementations a voice command received at the first device may be employed to control one or more second devices if the first and second devices are included in a same device set. Accordingly, a device set may be employed to regulate the control or access of one device through another device. Moreover, the device set information may also be employed to identify the devices that are members of a target device set specified in a voice command. For example, a voice command "play favorites list on living room audio output devices" may be parsed to identify "living room audio output devices" as the target device set on which the "favorites list" is to be played. The device set information may then be accessed to determine the audio enabled devices that are members of the device set "living room audio output devices".

FIG. 1 depicts an environment 100 in which audio functionality, or other types of functionality, may be shared among multiple devices. As shown in FIG. 1, the environment 100 may include one or more audio enabled devices 102. The audio enabled devices 102 may include any type of computing device or other electronic device that provides audio output functionality, audio input functionality, or both audio output and audio input functionality. The audio enabled devices 102 are described further with reference to FIG. 6.

The audio enabled devices 102 may include one or more audio enabled devices 102(1) that are standalone audio input/output (I/O) devices. Such audio enabled device(s) 102(1) may provide an audio input function for receiving and processing voice commands, or may provide an audio output function for playing audio content. In some cases, the audio enabled device(s) 102(1) may support both audio input and audio output. The audio enabled device(s) 102(1) may be substantially standalone (e.g., minimal) devices in that their functionality includes one or both of audio input and audio output, network communications capability, and sufficient storage and processing capacity to process audio and network data. In some cases, the audio enabled device(s) 102(1) may be without a display (e.g., headless). In some cases, one or more of the audio enabled device(s) 102(1) may provide an always-on audio input feature, such that the audio enabled device(s) 102(1) are able to receive and process audio input (e.g., voice commands) while in a normal or typical operating state.

The audio enabled devices 102 may include one or more audio enabled devices 102(2) that provide an audio output function through interactions with one or more audio playback components that are external to and in communication with the audio enabled device(s) 102(2). For example, the audio enabled device(s) 102(2) may include a set top box or a game console that is connected to an audio-visual presentation system 104 such as a home theater system, television, audio receiver, speakers, amplifiers, and so forth. The audio enabled device(s) 102(2) may employ the audio output components of the audio-visual presentation system 104 to play audio content. Although the example of FIG. 1 depicts the audio enabled device(s) 102(2) communicating with a particular component (e.g., a receiver) of the audio-visual presentation system 104, implementations are not so limited. The audio enabled device(s) 102(2) may send audio content or other information to any components of the audio-visual presentation system 104, including but not limited to audio output devices (e.g., speakers), display devices (e.g., televisions), storage devices, audio-visual recording or playback devices, game consoles, and so forth.

In some cases, the audio enabled device(s) 102(2) may also provide an audio input function enabling the audio enabled device(s) 102(2) to be controlled through voice commands or other audio input. In some cases, the audio enabled device(s) 102(2) may provide a clutched audio input feature, such that the audio enabled device(s) 102(2) are able to receive and process audio input (e.g., voice commands) while a user 106 is pressing a button on the audio enabled device(s) 102(2) or while a user 106 is otherwise manipulating the audio enabled device(s) 102(2).

The audio enabled devices 102 may include one or more audio enabled devices 102(3) that are user devices owned by, used by, or otherwise associated with one or more users 106. The audio enabled device(s) 102(3) may comprise any type of computing device, including but not limited to a server computer, a personal computer, a network computer, a smartphone, a tablet computer, a wearable computer, an implanted computer, a mobile gaming device, an electronic book reader, an automotive computer, a desktop computer, a laptop computer, a thin client, a terminal, and so forth. In some cases, the audio enabled device(s) 102(3) may include computing devices that are substantially mobile or portable, such as a tablet computer, a wearable computer, a smartphone, a mobile gaming device, or an electronic book reader.

The environment 100 may include any number of the audio enabled devices 102 distributed in any location or orientation within the environment 100. For example, the audio enabled devices 102 may be distributed throughout the various rooms of a home, such as bedrooms, offices, living rooms, home theater rooms, dining rooms, bathrooms, kitchens, and so forth. Although the examples herein describe implementations operating within a home environment, implementations are not so limited. Implementations may also operate in other environments, including but not limited to offices, commercial spaces, other types of buildings, or other enclosed, indoor spaces. Implementations may also operate in outdoor environments, such as parks, playgrounds, stadiums, and so forth. In some cases, any number of the audio enabled devices 102 may comprise a cluster, cloud, farm, or other grouping of multiple devices that coordinate operations to provide load balancing, failover support, parallel processing capabilities, shared storage resources, or other aspects. As described above, the audio enabled devices 102 may be grouped into any number of device sets 108 for shared functionality. The device set(s) 108 are described further with reference to FIGS. 8-11, and the designation of a device set 108 is described further with reference to FIGS. 12 and 13. A device set 108 may include one or more of the audio enabled devices 102.

In some implementations, a user 106 within the environment 100 may issue a voice command 110. In some cases, the voice command 110 may be an utterance spoken by the user 106. Alternatively, the voice command 110 may be any other type of sound generated or caused by the user 106, including but not limited to any number of hand claps, finger snaps, whistles, and so forth. The voice command 110 may also include sounds caused by the user 106 impacting a part of the user's body against another object, or noises caused by the user 106 manipulating a musical instrument or other object. Moreover, implementations are not limited to voice commands 110 issued by human users 106. Implementations also support voice commands 110 that are sounds generated by other entities such as animals, robots, or computing devices. Implementations support audio output (e.g., audio playback) and audio input (e.g., voice command inputs) in any sonic range, including sounds in a frequency range that is audible to humans, sounds having a higher frequency than the human audible range (e.g., ultrasound), and sounds having a lower frequency than the human audio range (e.g., infrasound).

The voice command 110 may be received by at least one of the audio enabled devices 102. The receiving audio enabled device(s) 102 may analyze the voice command 110 to determine one or more instructions 112 to be employed to instruct one or more target audio enabled devices 102 to perform one or more operations specified in the voice command 110. In some cases, the voice command 110 may be analyzed by the receiving audio enabled device 102. Alternatively, the voice command 110 may be sent to one or more distributed computing devices for analysis. The instruction(s) 112 may be sent to the target audio enabled device(s) 102 specified in the voice command 110, to instruct the target audio enabled device(s) 102 to perform the operation(s) specified in the voice command 110.

In the example of FIG. 1, the user 106 issues the voice command 110 requesting "play song on living room TV". The voice command 110 may be received by one of the audio enabled device(s) 102(1) (e.g., a standalone audio I/O device). The receiving audio enabled device 102(1) may parse or otherwise analyze the voice command 110 to determine the requested operation "play song" and to determine the target device "living room TV" on which the audio is to be played. The instruction(s) 112 may be generated to instruct the target device to "play song" and the instruction(s) 112 may be sent to the target device. In this example, the target device is one of the audio enabled device(s) 102(2) that is a set top box connected to the audio-visual presentation system 104 (e.g., "the living room TV"). On receiving the instruction(s) 112, the target audio enabled device 102(2) may play the requested "song" as audio output 114 through the audio playback component(s) of the audio-visual presentation system 104. In some cases, the target audio enabled device 102 may retrieve the requested audio content from local storage, or may request the audio content over a network from a remote service. Alternatively, the receiving audio enabled device 102 may retrieve the requested audio content from local storage, or may request the audio content over a network from a remote service. The receiving audio enabled device 102 may then send the audio content to the target audio enabled device 102.

In some implementations the receiving audio enabled device 102 may send the instruction(s) 112, and in some cases the audio content, over a peer-to-peer network established between the receiving audio enabled device 102 and the target audio enabled device 102. In some cases, the employed peer-to-peer network may be a wireless network, such as a wireless network that complies with a version of the IEEE 802.11 standard. A peer-to-peer network may include any type of network architecture in which any node (e.g., an audio enabled device 102) of the network may act as one or both of a provider and a consumer of information. Accordingly, any number of pairs of the audio enabled devices 102 may each establish a peer-to-peer network that connects the pair, and that enables the instruction(s) 112 or audio content to be sent from one to the other. In some cases, a peer-to-peer network may be established (e.g., ad hoc) between a pair of devices, and may not be managed by a router, access point, or other network management device. For example, a peer-to-peer network may be distinct from a LAN or WLAN.

Figure 2:
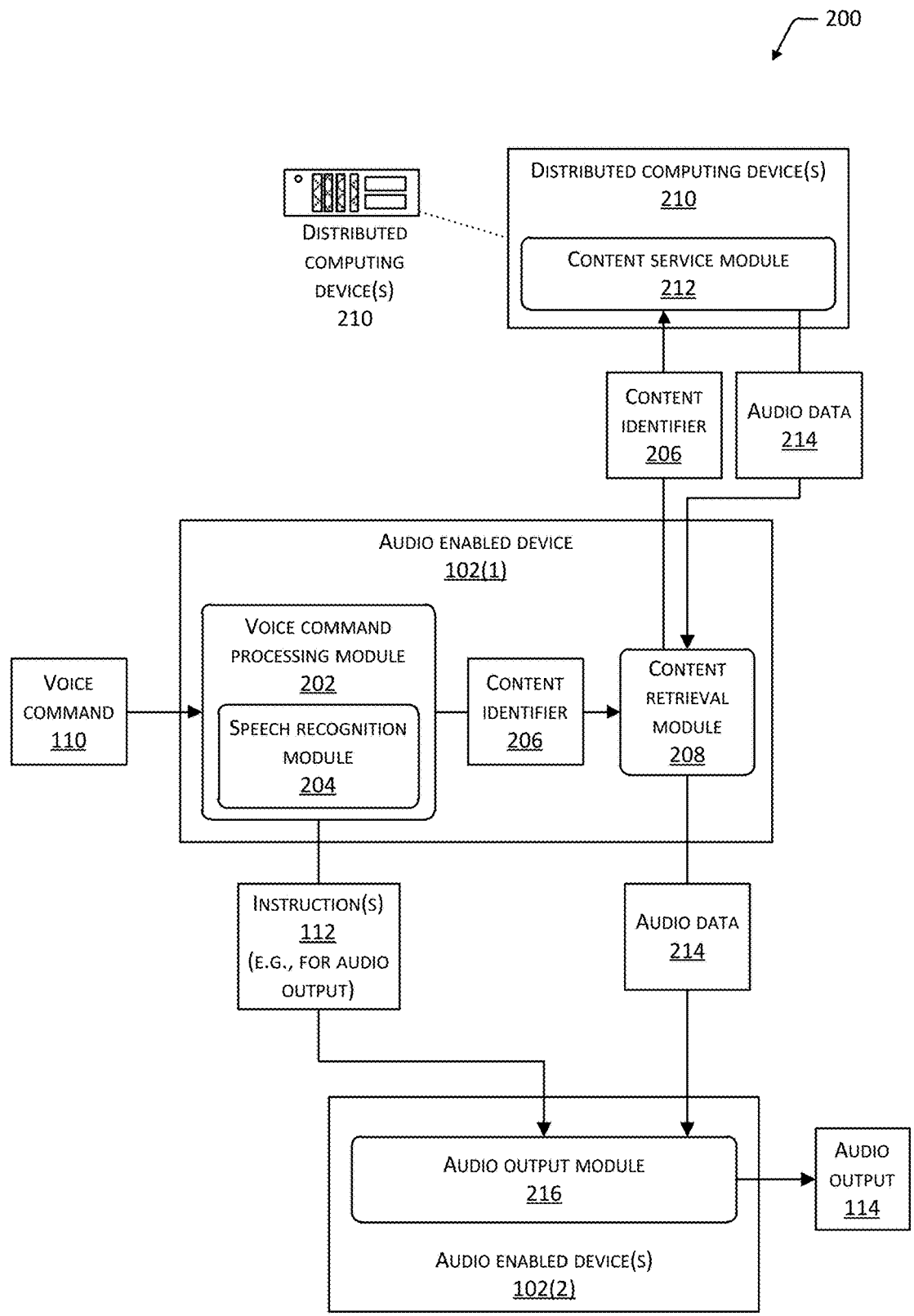
FIG. 2 depicts an environment including audio enabled devices grouped into a device set for shared audio functionality, in which a voice command received at a first device is employed to retrieve audio content and provide the audio content to be presented through a second device.

FIG. 2 depicts an environment 200 including audio enabled devices 102 grouped into a device set 108 for shared audio functionality. FIG. 2 provides a more detailed depiction of the example shown in FIG. 1. Elements of FIG. 2 may be configured similarly to like-numbered elements of FIG. 1, or may perform similar operations to like-numbered elements of FIG. 1. In the example of FIG. 2, a voice command 110 is received by a voice command processing module 202 executing on a first audio enabled device 102(1) (e.g., the receiving device). In implementations illustrated by FIG. 2, the voice command processing module 202 may include a speech recognition module 204 that recognizes words, phrases, or other sounds included in the voice command 110. Implementations support the use of any type of speech recognition software.

The speech recognition module 204 may determine a content identifier (ID) 206 based on its analysis of the voice command 110. The content ID 206 may identify one or more particular songs, tracks, albums, or other instances of audio content. In some cases, the content ID 206 may identify a curated collection of audio content, such as a playlist, a favorites list, and so forth. The content ID 206 may also identify a particular class, type, or category of audio content (e.g., "classical guitar music"). The content ID 206 may be provided to a content retrieval module 208 executing on the audio enabled device 102(1).

In some implementations, the content retrieval module 208 may send the content ID 206 to one or more distributed computing device(s) 210 that execute a content service module 212. In response to receiving the content ID 206, the content service module 212 may send audio data 214 to the content retrieval module 208, the audio data 214 corresponding to the audio content identified by the content ID 206. The audio data 214 may be provided in any format including but not limited to any version of: the Waveform Audio File Format (WAV); the AU file format, the Moving Picture Experts Group (MPEG) formats such as MPEG-1, MPEG-2, MP3, or MPEG-4 formats; or the Audio Video Interleave (AVI) format. In some cases, the audio data 214 may be sent in a file from the distributed computing device(s) 210 to the audio enabled device 102(1), and processed by the content retrieval module 208 after the file transfer is complete. Alternatively, the audio data 214 may be sent as a stream from the distributed computing device(s) 210 to the audio enabled device 102(1), and processed progressively by the content retrieval module 208 while the audio data 214 is being received. In some implementations, the audio data 214 may be cached or otherwise stored in memory on the audio enabled device 102(1), and retrieved from local storage instead of being requested from the distributed computing device(s) 210.

The distributed computing device(s) 210 may be any type of computing device, including but not limited to a server computer, a personal computer, a network computer, a desktop computer, a rack-mounted computer, and so forth. In some cases, any number of the distributed computing device(s) 210 may comprise a cluster, cloud, farm, or other grouping of multiple devices that coordinate operations to provide load balancing, failover support, parallel processing capabilities, shared storage resources, or other aspects. An example of the distributed computing device(s) 210 is described further with reference to FIG. 7.

Based on its analysis of the voice command 110, the speech recognition module 204 may determine the one or more audio enabled devices 102(2) (e.g., the target device(s)) on which the requested audio content is to be played. The speech recognition module 204 may also determine one or more instructions 112 to instruct the audio enabled device(s) 102(2) to play the requested audio content. The instruction(s) 112 and the audio data 214 may be sent to an audio output module 216 executing on the audio enabled device(s) 102(2). The audio output module 216 may execute the instruction(s) 112 that cause the audio output module 216 to play the audio data 214, generating the audio output 114.

Figure 3:
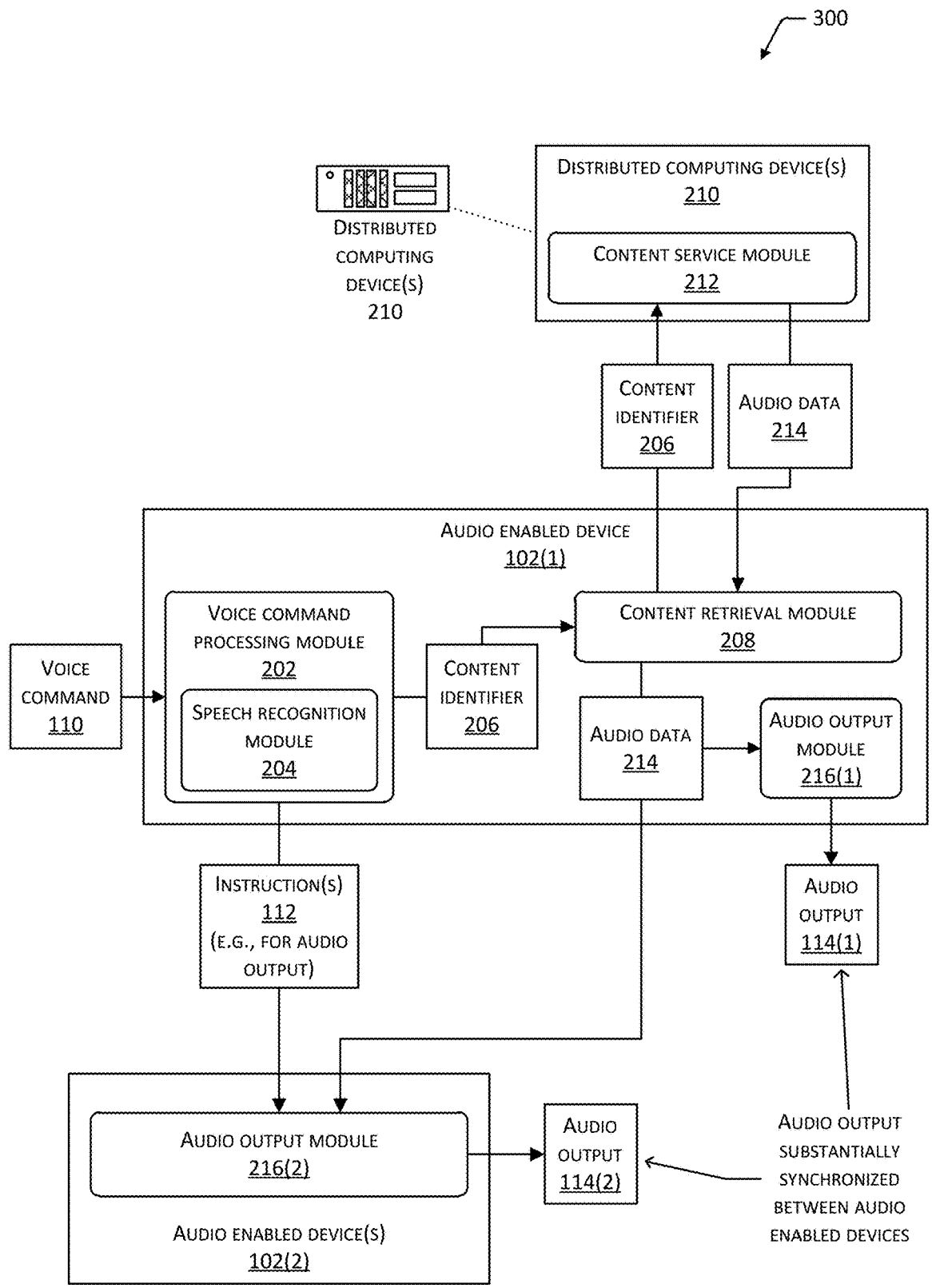
FIG. 3 depicts an environment including audio enabled devices grouped into a device set for shared audio functionality, in which a voice command received at a first device is employed to retrieve audio content and provide the audio content to be presented through a second device in substantially synchronized playback with the audio content presented through the first device.

FIG. 3 depicts an environment 300 including audio enabled devices 102 grouped into a device set 108 for shared audio functionality. Elements of FIG. 3 may be configured similarly to like-numbered elements of FIGS. 1 and 2, or may perform similar operations to like-numbered elements of FIGS. 1 and 2. In implementations illustrated by FIG. 3, the audio data 214 received by the content retrieval module 208 may be provided to an audio output module 216(1) executing on the audio enabled device 102(1) as well as to the audio output module 216(2) executing on the audio enabled device(s) 102(2). This may occur when the audio enabled device 102(1) is included in the target devices identified in the voice command 110, such that the audio enabled device 102(1) is designated as both the receiving device and a target device. The audio output module 216(1) may play the audio data 214 as audio output 114(1), and the audio output module 216(2) may play the audio data 214 as audio output 114(2). In this example, the audio output 114(1) and the audio output 114(2) may be played in parallel, in a substantially synchronized playback. Alternatively, the audio output 114(1) and the audio output 114(2) may be played progressively, such that one of the audio output 114(1) or the audio output 114(2) is played during a first time period and the other of the audio output 114(1) or the audio output 114(2) is played during a second time period that does not overlap with the first time period.

The substantially synchronous playback of the audio output 114(1) and the audio output 114(2) may be synchronous in time within a predetermined tolerance threshold. For example, the audio output 114(1) and the audio output 114(2) may be synchronized to play within 20 milliseconds beyond which the human hearing system may be able to discern asynchronous playback. In some implementations, synchronization of the audio output 114(1) and the audio output 114(2) may be accomplished by synchronizing the audio enabled devices 102(1) and 102(2) to a same clock. In some cases, the clock of one of the audio enabled devices 102 may be designated as a master clock, and the other audio enabled devices 102 may synchronize their clocks to the master clock.

Figure 4:
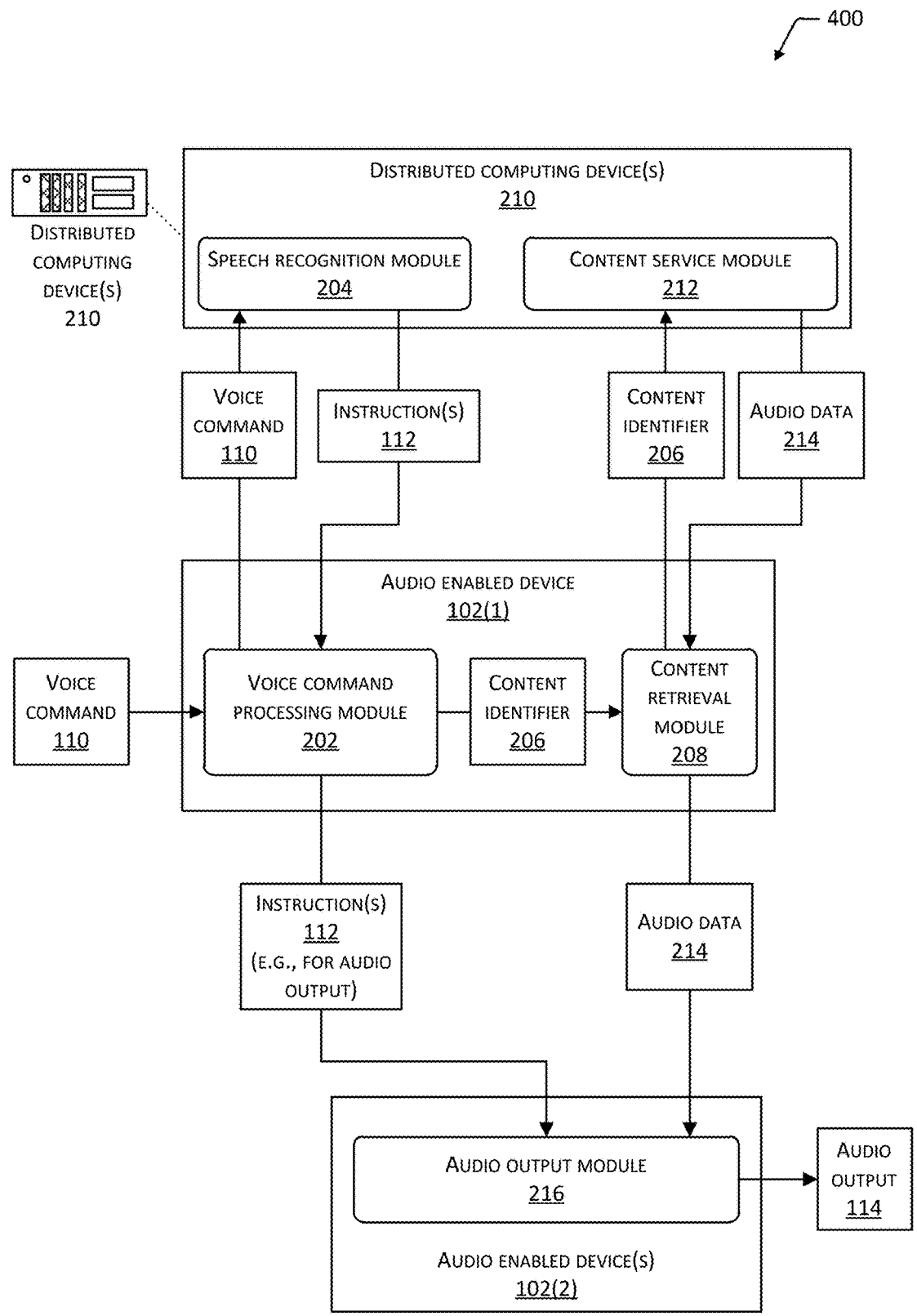
FIG. 4 depicts an environment including audio enabled devices grouped into a device set for shared audio functionality, in which a voice command received at a first device is employed to retrieve audio content and provide the audio content to be presented through a second device, and wherein the voice command is analyzed using a speech recognition module executing on one or more distributed computing devices.

FIG. 4 depicts an environment 400 including audio enabled devices 102 grouped into a device set 108 for shared audio functionality. Elements of FIG. 4 may be configured similarly to like-numbered elements of FIGS. 1-3, or may perform similar operations to like-numbered elements of FIGS. 1-3. In implementations illustrated by FIG. 4, the voice command 110 is analyzed using a speech recognition module 204 executing on the distributed computing device(s) 210 instead of on the audio enabled device 102(1).

On receiving the voice command 110, the voice command processing module 202 may send the voice command 110 to the speech recognition module 204 executing on the distributed computing device(s) 210. The speech recognition module 204 may parse or otherwise analyze the voice command 110, and determine one or more instructions 112 based on the analysis. The instruction(s) 112 may be returned to the voice command processing module 202. The speech recognition module 204 may also parse the voice command 110 to identify the requested audio content, and may determine the content ID 206 that identifies the audio content to be played. The content ID 206 may be returned to the voice command processing module 202 from the speech recognition module 204. The speech recognition module 204 may also determine, based on the voice command 110, the content ID 206 identifying the requested audio content and an identification of the target audio enabled device(s) 102(2) on which the audio content is to be played. The content ID 206 and identification of the target audio enabled device(s) 102(2) may also be provided to the voice command processing module 202. Processing may then proceed as described above with reference to FIGS. 2 and 3. In some implementations, the speech recognition module 204 may execute on different ones of the distributed computing devices 210 than the content service module 212. Alternatively, the speech recognition module 204 and the content service module 212 may execute on the same distributed computing device(s) 210. In some implementations, the speech recognition module 204 may communicate the instruction(s) 112 and the content ID 206 directly to the audio enabled device(s) 102(2), enabling the audio output module 216 of the audio enabled device(s) 102(2) to play the audio content as the audio output 114.

Figure 5:
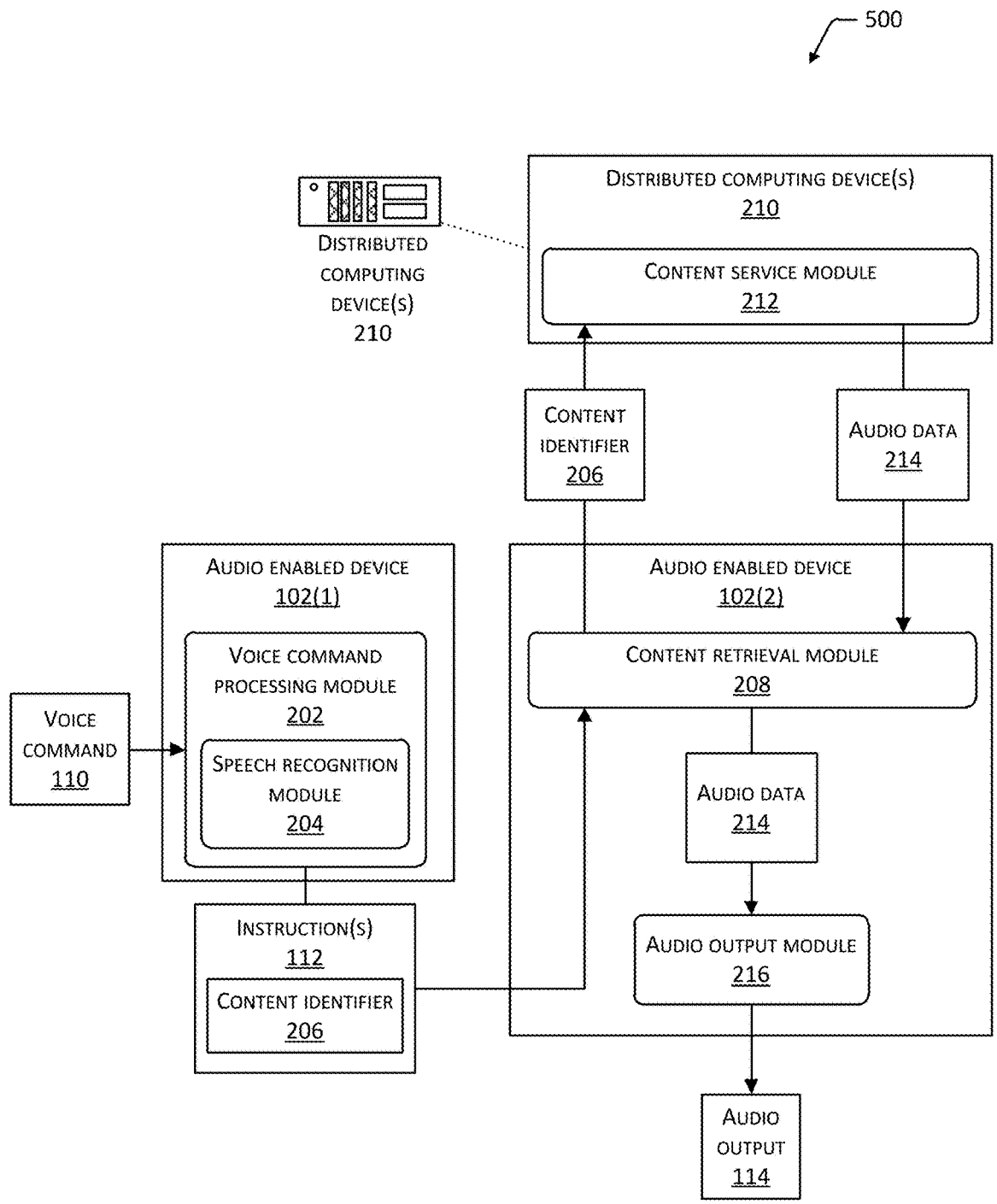
FIG. 5 depicts an environment including audio enabled devices grouped into a device set for shared audio functionality, in which a voice command received at a first device is analyzed to determine one or more instructions, and the instruction(s) are sent to instruct a second device to retrieve and present audio content specified in the voice command.

FIG. 5 depicts an environment 500 including audio enabled devices 102 grouped into a device set 108 for shared audio functionality. Elements of FIG. 5 may be configured similarly to like-numbered elements of FIGS. 1-4, or may perform similar operations to like-numbered elements of FIGS. 1-4. The voice command 110 may be received at the audio enabled device 102(1) and processed to determine the instruction(s) 112, the content ID 206, and the target audio enabled device(s) 102(2). In implementations illustrated by FIG. 5, the instruction(s) 112 and the content ID 206 may be sent to a content retrieval module 208 executing on the target audio enabled device(s) 102(2). The content retrieval module 208 may then request and receive the audio data 214 from the distributed computing device(s) 210 based on the content ID 206. In some cases, the content ID 206 may be specified as a Uniform Resource Identifier (URI) such as a Uniform Resource Locator (URL) or Uniform Resource Name (URN). The content ID 206 may provide a fully qualified network location of the audio data 214 identified by the content ID 206. On receiving the audio data 214, the content retrieval module 208 may provide the audio data 214 to the audio output module 216 for playback as the audio output 114.

Although FIGS. 1-5 provide example configurations of devices and environments supported by implementations, implementations are not limited to these examples. Some implementations may employ the various features described with reference to FIGS. 1-5 in any combination. For example, the audio enabled device 102(1) may employ a speech recognition module 204 executing on the distributed computing device(s) 210 to analyze the voice command 110, instead of or in addition to a locally executing speech recognition module 204. As another example, in FIG. 5 the voice command 110 may specify a device set 108 of target audio enabled devices 102 that include the receiving audio enabled device 102(1). In such cases, the audio enabled devices 102(1) and 102(2) may each independently request and receive the audio data 214 from the distributed computing device(s) 210 based on the content ID 206, and may each play the audio content in substantially synchronized audio outputs 114 as shown in FIG. 3. Examples of shared audio functionality among devices of a device set 108 are described further with reference to FIGS. 14-17.

The various devices of the environments 100, 200, 300, 400, and 500 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environments 100, 200, 300, 400, and 500 may be encrypted or otherwise secured. For example, such communications may employ one or more public or private cryptographic keys, ciphers, digital certificates, or other credentials supported by a security protocol such as any version of the Secure Sockets Layer (SSL) or the Transport Layer Security (TLS) protocol.

Figure 6:
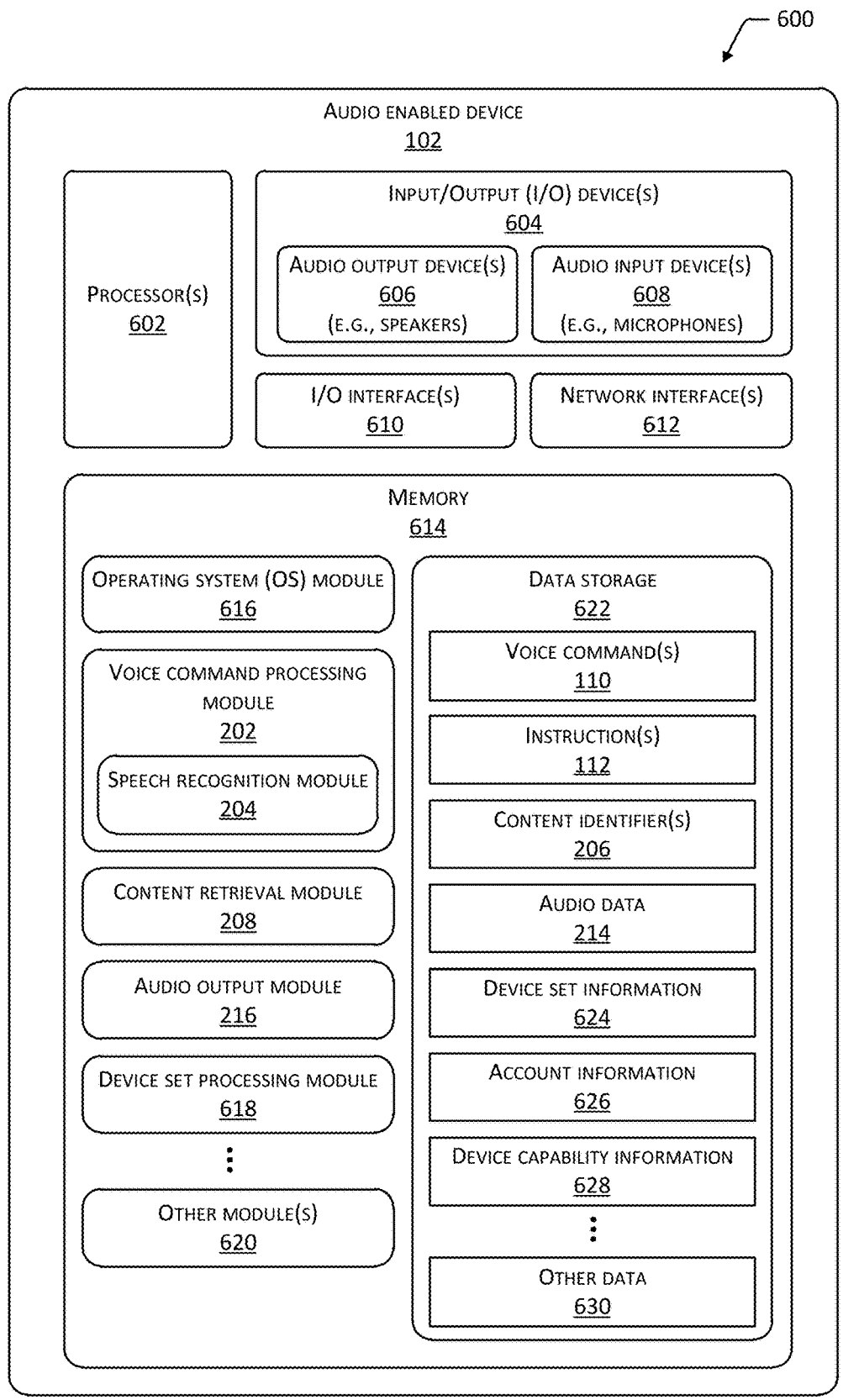
FIG. 6 depicts a block diagram of an example audio enabled device configured to provide one or both of audio input functionality and audio output functionality.

FIG. 6 depicts a block diagram 600 of an example of the audio enabled device(s) 102. As shown in the block diagram 600, the audio enabled device 102 may include one or more processors 602 (e.g., hardware-based processor(s)) configured to execute one or more stored instructions. The processor(s) 602 may comprise one or more cores.

The audio enabled device 102 may include one or more I/O devices 604. The I/O device(s) 604 may include input devices such as a keyboard, a mouse, a pen, a game controller, a touch input device, a gestural input device, a haptic input device, an image or video capture device (e.g., a camera), or other devices. In some cases, the I/O device(s) 604 may also include output devices such as a display, a printer, a haptic output device, and so forth. The I/O device(s) 604 may be physically incorporated with the audio enabled device 102, or may be externally placed.

The I/O device(s) 604 may include one or more audio output devices 606, including but not limited to speakers, bone conduction audio output devices, or haptic actuators that generate vibrations in an audible frequency range. The audio output device(s) 606 may present audio output in any audio frequency range. The I/O device(s) 604 may also include one or more audio input devices 608, including but not limited to microphones. The audio input device(s) 608 may detect sounds in any audio frequency range. In some cases, the audio input device(s) 608 may be directional, such that they are configured to determine a direction of the source of a sound.

The audio enabled device 102 may include one or more I/O interfaces 610 to enable components or modules of the audio enabled device 102 to control, interface with, or otherwise communicate with the I/O device(s) 604. The I/O interface(s) 610 may enable information to be transferred in or out of the audio enabled device 102, or between components of the audio enabled device 102, through serial communication, parallel communication, or other types of communication. For example, the I/O interface(s) 610 may comply with a version of the RS-232 standard for serial ports, or with a version of the Institute of Electrical and Electronics Engineers (IEEE) 1284 standard for parallel ports. As another example, the I/O interface(s) 610 may be configured to provide a connection over Universal Serial Bus (USB) or Ethernet. In some cases, the I/O interface(s) 610 may be configured to provide a serial connection that is compliant with a version of the IEEE 1394 standard. The I/O interface(s) 610 may be configured to convey audio information according to the Sony/Philips Digital Interface Format (S/PDIF), the Toshiba Link (TOSLINK) format, or according to other audio interconnection standards. The audio enabled device 102 may also include one or more busses or other internal communications hardware or software that allow for the transfer of data between the various modules and components of the audio enabled device 102.

The audio enabled device 102 may include one or more network interfaces 612 that enable communications between the audio enabled device 102 and other network accessible computing devices, such as the distributed computing device(s) 210. The network interface(s) 612 may include one or more network interface controllers (NICs) or other types of transceiver devices configured to send and receive communications over a network.

The audio enabled device 102 may include one or more memories, described herein as memory 614. The memory 614 comprises one or more computer-readable storage media (CRSM). The CRSM may include one or more of an electronic storage medium, a magnetic storage medium, an optical storage medium, a quantum storage medium, a mechanical computer storage medium, and so forth. The memory 614 provides storage of computer-readable instructions that may describe data structures, program modules, processes, applications, or other data for the operation of the audio enabled device 102. In some implementations, the memory 614 may provide storage of computer-readable instructions or other information in a non-transitory format.

The memory 614 may include an operating system (OS) module 616. The OS module 616 may be configured to manage hardware resources such as the I/O device(s) 604, the I/O interface(s) 610, and the network interface(s) 612, and to provide various services to applications, processes, or modules executing on the processor(s) 602. The OS module 616 may include one or more of the following: any version of the Linux operating system; any version of iOS from Apple Corp. of Cupertino, Calif., USA; any version of Windows or Windows Mobile from Microsoft Corp. of Redmond, Wash., USA; any version of Android from Google Corp. of Mountain View, Calif., USA and its derivatives from various sources; any version of Palm OS from Palm Computing, Inc. of Sunnyvale, Calif., USA and its derivatives from various sources; any version of BlackBerry OS from Research In Motion Ltd. of Waterloo, Ontario, Canada; any version of VxWorks from Wind River Systems of Alameda, Calif., USA; or other operating systems.

The memory 614 may include one or more of the modules described above as executing on the audio enabled device 102, such as the voice command processing module 202, the speech recognition module 204, the content retrieval module 208, and the audio output module 216. In some implementations, the memory 614 may include a device set processing module 618 that performs operations for designating a device set 108 that includes one or more audio enabled devices 102. Such operations are described further with reference to FIGS. 12 and 13. The memory 614 may also include one or more other modules 620, such as a user authentication module or an access control module to secure access to the audio enabled device 102, and so forth.

The memory 614 may include data storage 622 to store data for operations of the audio enabled device 102. The data storage 622 may comprise a database, array, structured list, tree, or other data structure, and may be a relational or a non-relational datastore. The data storage 622 may store data such as that described above, including one or more of the voice command(s) 110, the instruction(s) 112, the content IDs 206, or the audio data 214. The data storage 622 may also store device set information 624 describing one or more device sets 108. The device set information 624 is described further with reference to FIGS. 8-11. In some implementations, the data storage 622 may store account information 626 describing one or more user accounts associated with each of one or more audio enabled devices 102. The data storage 622 may also store device capability information 628 describing the functions (e.g., audio input or output functions, video functions, and so forth) supported by each of one or more audio enabled devices 102. The data storage 622 may also store other data 630, such as user authentication information or access control data. In some implementations, at least a portion of the information stored in the data storage 622 may be stored externally to the audio enabled device 102, or on other devices that may communicate with the audio enabled device 102 via the I/O interface(s) 610 or via the network interface(s) 612.

Figure 7:
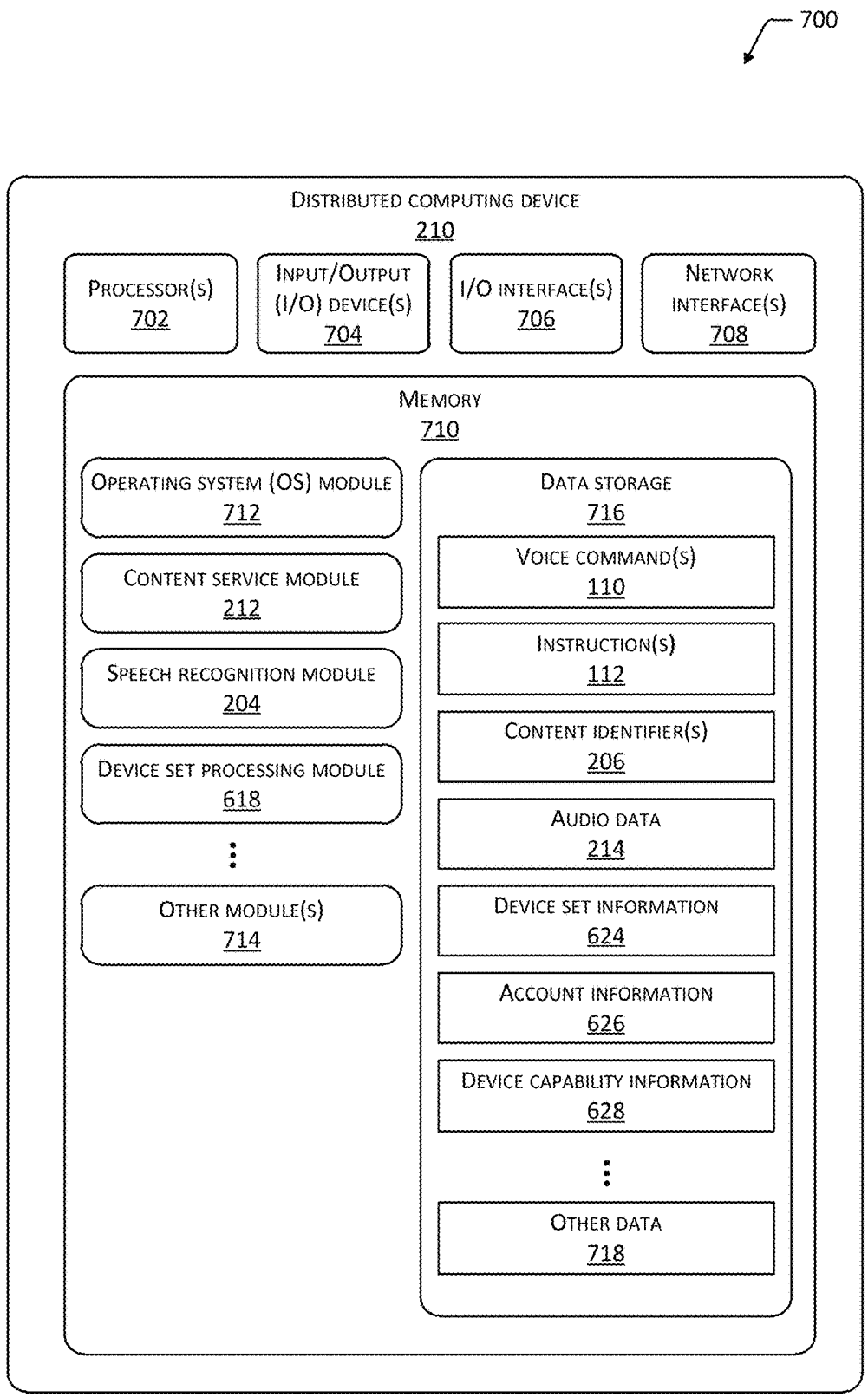
FIG. 7 depicts a block diagram of an example distributed computing device configured to provide speech recognition functionality for interpreting voice commands, and to serve audio content to be played on one or more audio enabled devices.

FIG. 7 depicts a block diagram 700 of an example of the distributed computing device(s) 210. As shown in the block diagram 700, the distributed computing device 210 may include one or more processors 702 (e.g., hardware-based processor(s)) configured to execute one or more stored instructions. The processor(s) 702 may comprise one or more cores. The distributed computing device 210 may include one or more I/O devices 704, one or more I/O interfaces 706, and one or more network interfaces 708 as described above respectively with reference to the I/O device(s) 604, the I/O interface(s) 610, and the network interface(s) 612.

The distributed computing device 210 may include one or more memories, described herein as memory 710. The memory 710 comprises one or more CRSM, as described above with reference to the memory 614. The memory 710 may include an OS module 712 that is configured to manage hardware resources such as the I/O device(s) 704, the I/O interface(s) 706, and the network interface(s) 708, and to provide various services to applications, processes, or modules executing on the processor(s) 702. The OS module 712 may include one or more of the operating systems described above with reference to the OS module 616. The memory 710 may include one or more of the modules described above as executing on the distributed computing device 210, such as the content service module 212 and the speech recognition module 204. In some implementations, the memory 710 may include the device set processing module 618 that performs operations for designating device sets 108, as described with reference to FIGS. 12 and 13. The memory 710 may also include one or more other modules 714, such as a user authentication module or an access control module to secure access to the distributed computing device 210, and so forth.

The memory 710 may include data storage 716 to store data for operations of the distributed computing device 210. The data storage 716 may comprise a database, array, structured list, tree, or other data structure, and may be a relational or a non-relational datastore. The data storage 716 may include data that is in active memory on the distributed computing device 210, or data that is written to a hard drive, disk, or other non-volatile storage on the distributed computing device 210. The data storage 716 may store data such as that described above, including one or more of the voice command(s) 110, the instruction(s) 112, the content ID(s) 206, and the audio data 214. In some implementations, the data storage 716 may store the device set information 624 that describes one or more device sets 108. In some implementations, the data storage 716 may store the account information 626 describing one or more user accounts associated with each of one or more audio enabled devices 102. The data storage 716 may also store the device capability information 628 describing the functions (e.g., audio input or output functions, video functions, and so forth) supported by each of one or more audio enabled devices 102. The data storage 716 may also store other data 718, such as user authentication information or access control data. In some implementations, at least a portion of the information stored in the data storage 716 may be stored externally to the distributed computing device 210, on other devices that may communicate with the distributed computing device 210 via the I/O interface(s) 706 or via the network interface(s) 708.

FIG. 8 depicts a schematic 800 illustrating an example format for the device set information 624 describing one or more device sets 108. The device set information 624 may describe any number of device sets 108 that each includes any number of audio enabled devices 102 grouped for shared audio functionality. As shown in the example of FIG. 8, the device set information 624 may include device set information 624(1) that describes a device set 108. The device set information 624(1) may include a device set description 802. The device set description 802 may indicate the location(s), user ownership, or functionality employed to designate the device set 108. For example, the device set description 802 may be "Ramirez family audio output devices", "master bedroom TV", "living room set top box", "whole house audio playback devices", "upstairs audio output devices", "Michael's game console", and so forth.

The device set information 624(1) may also include a list of included devices 804, listing any number of audio enabled devices 102 included in the device set 108. Each entry in the list of included devices 804 may specify one or more of a device ID 806, a device name 808, a location 810, or supported functions 812. The device ID 806 may identify the audio enabled device 102 based on its MAC address, URI, IP address, or using another type of identifier. The device ID 806 may uniquely identify the audio enabled device 102 generally, or may uniquely identify the audio enabled device 102 within the scope of devices associated with a particular user 106 or group of users. The device name 808 may be a hostname, user-assigned name, or some other name that may describe the audio enabled device 102.

In some cases, the location 810 may provide a location of the audio enabled device 102 relative to a home, office, or other setting. For example, the location 810 may be "living room", "kitchen", "Rebecca's office", "game room", "master bedroom", "northwest corner of living room", and so forth. The location 810 may also specify geographic coordinates of the audio enabled device 102, as determined through information provided by a satellite-based navigation system such a Global Positioning System (GPS) or other signal-based location determination system.

The supported functions 812 may list any number of audio input functions, audio output functions, or other types of functions supported by the audio enabled device 102. The supported functions 812 may provide any level of specificity. In some cases, supported functions 812 may include "audio output", indicating that the audio enabled device 102 provides some type of audio playback capability. The supported functions 812 may also include more detailed descriptions of the audio playback capability of the audio enabled device 102. For example, the supported functions 812 may also include "audio output subwoofer", indicating that the audio enabled device 102 provides audio playback capability in a lower frequency range, such that the audio enabled device 102 may be suitable to play a low frequency (e.g., subwoofer) channel in a surround sound configuration with other audio enabled devices 102. The supported functions 812 may include "audio output stereo" or "audio output mono" indicating that the audio enabled device 102 is respectively configured to play audio content including multiple channels or a single channel. The supported functions 812 may include "audio output 5.1" or "audio output 7.1" indicating that the audio enabled device 102 is respectively configured to play audio content in a 5.1 or 7.1 surround sound format, or in other surround sound formats including any number of channels.

The supported functions 812 may also list other types of functions supported by the device, including but not limited to: video output functionality (e.g., display functionality); audio, video, or image recording or capture capabilities (e.g., through the use of camera(s), microphone(s), etc.); gaming functionality; support for a graphical user interface (GUI); capabilities to control networked appliances; and so forth. Implementations may also support the inclusion of other types of information in the device set information 624, such as an identification of a user associated with each of the audio enabled device(s) 102, a current state of the audio enabled device(s) 102 (e.g., powered on, powered off, asleep, suspended, etc.), and so forth.

FIGS. 9-11 depict schematics 900, 1000, and 1100 illustrating an example of device set information 624 that describes multiple device sets 108. As shown in the example of FIGS. 9-11, the device set information 624 may include any number of sections, and each section may include information describing a device set 108. In the example, the device set information 624 is delineated or otherwise specified using metadata in which various tags indicate the type of data included in the tags. Implementations are not limited to the particular tags and attributes included in FIGS. 9-11, or the arrangement or ordering of the tags and attributes.

FIGS. 9-11 illustrate an example of nested or hierarchical device sets 108, in which one device set 108 may include a subset of the audio enabled devices 102 included in another device set 108. For example, as shown in FIG. 9, the device set 108 "audio output devices" includes ten audio enabled devices 102 located in various rooms of a home. One of the audio enabled devices 102, named "tablet13", may not include a location attribute given that it is a mobile device. A second device set 108 "living room audio output devices" includes those audio enabled devices 102 located in the "living room". With reference to FIG. 10, a third device set 108 "living room audio output devices for home theater" includes the audio enabled devices 102 that are located in the "living room" and that have been designated (either automatically or by a user) as to be used in conjunction with a home theater system. Other device sets 108 listed in FIGS. 10 and 11 describe a further level of hierarchy, listing the audio enabled devices 102 to be used for the rear channel, left channel, and right channel in the home theater configuration. FIG. 11 also includes an additional device set 108 "audio input devices", listing the audio enabled devices 102 that are configured to provide an audio input function to receive and/or process voice commands 110. The designation of a device set 108 is described further with reference to FIGS. 12 and 13.

Figure 12:
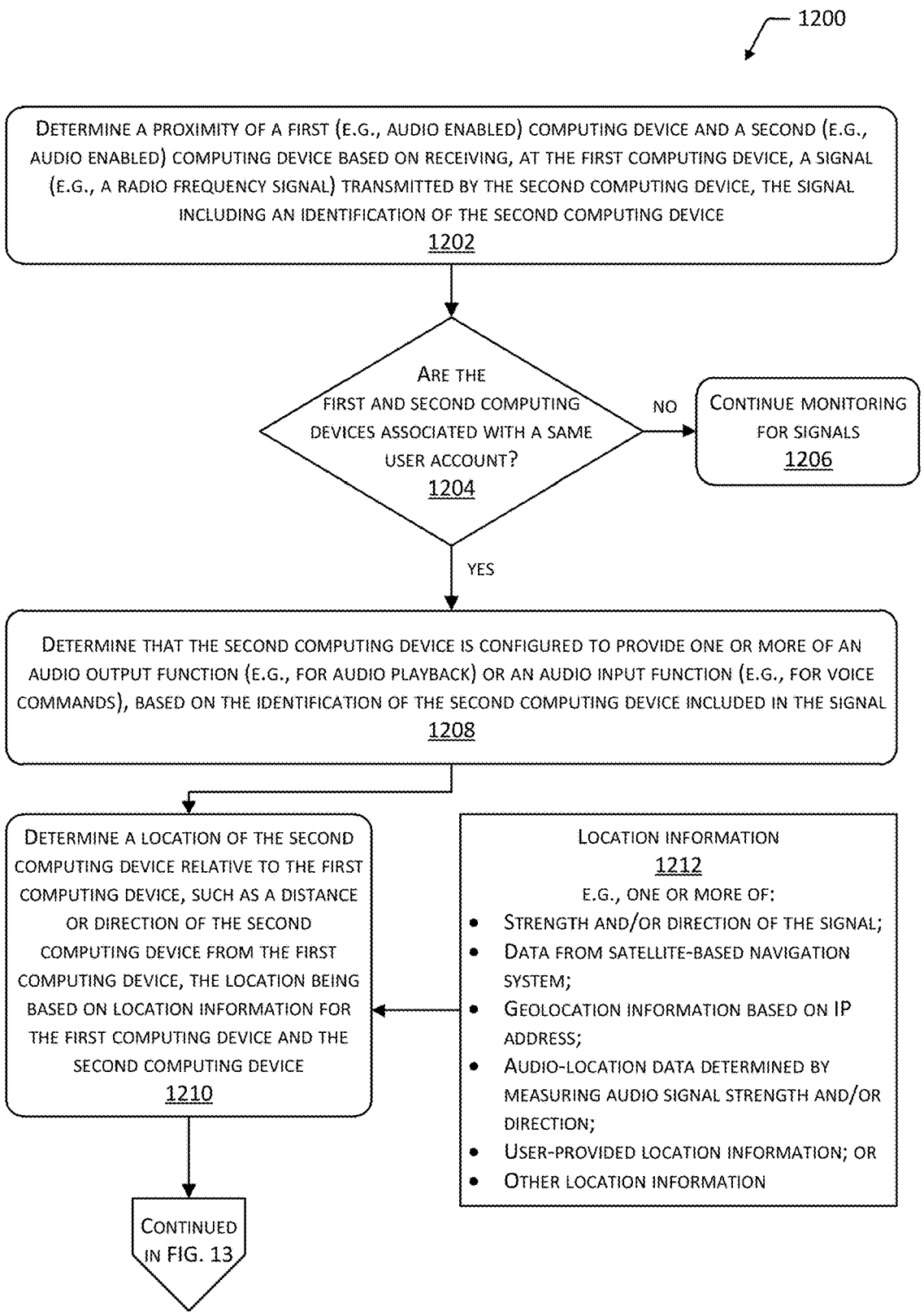
FIG. 12 depicts a flow diagram of a process for detecting a second audio enabled device in proximity to a first audio enabled device, and for determining that the first and second audio enabled devices are within a threshold distance or at a common location.
Figure 13:
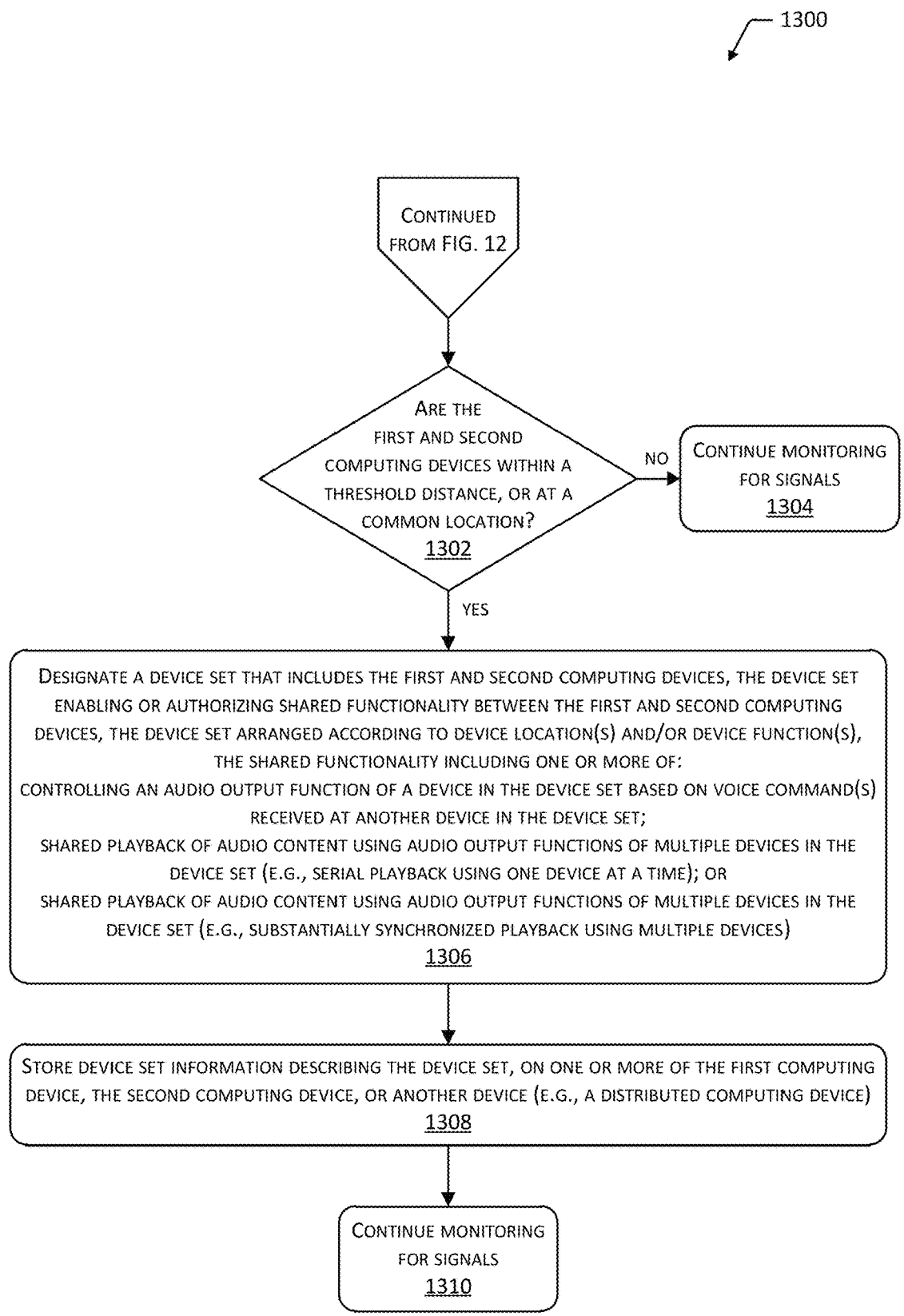
FIG. 13 depicts a flow diagram of a process for designating a device set that includes first and second audio enabled devices, based on the first and second audio enabled devices being associated with a same user account.

FIGS. 12 and 13 depict flow diagrams 1200 and 1300 of a process for designating a device set 108 that includes first and second audio enabled devices 102. One or more operations of the process may be performed by the device set processing module 618, or by other modules executing on the audio enabled device(s) 102, the distributed computing device(s) 210, or other devices.

At 1202, a determination is made of a proximity of a first audio enabled device 102(1) and a second audio enabled device 102(2). In some implementations the proximity is determined based on receiving, at the audio enabled device 102(1), a signal transmitted by the audio enabled device 102(2). In some cases, the signal may be a radio frequency signal, which may be arranged according to a version of the IEEE 802.11 standard. The signal may include an identification of the audio enabled device 102(2). By transmitting the signal, the audio enabled device 102(2) may indicate its presence in an environment and enable other audio enabled devices 102 to discover and communicate with the audio enabled device 102(2).

At 1204, a determination is made whether the audio enabled devices 102(1) and 102(2) are associated with a same user account for a single user 106 or a group of users 106. In some cases, the user account(s) for the audio enabled devices 102(1) and 102(2) may be based on the user(s) 106 who purchased the audio enabled devices 102(1) and 102(2) through an online store, or based on the user(s) 106 who were otherwise associated with the audio enabled devices 102(1) and 102(2) at time of purchase or after. If the audio enabled devices 102(1) and 102(2) are not associated with a same user account, the process may proceed to 1206 and continue monitoring for signals from audio enabled devices 102. If the audio enabled devices 102(1) and 102(2) are associated with a same user account, the process may proceed to 1208.

In some implementations, a user account may be associated with an audio enabled device 102 during or after the purchase of the audio enabled device 102. For example, during the purchase of the audio enabled device 102 from an online (or offline) store, the purchaser may specify the user account to be associated with the audio enabled device 102, or the user account may default to a login or other credential that the purchaser employs to purchase the audio enabled device 102 through an online store. In some implementations, the user account may be associated with the audio enabled device 102 after purchase of the audio enabled device 102, during a setup process in which the user 106 may employ speech or text input capabilities of the audio enabled device 102 (or of another audio enabled device 102) to specify the user account to be associated with the audio enabled device 102.

Determining the user account associated with an audio enabled device 102 includes accessing the account information 626 that describes one or more user accounts associated with one or more audio enabled devices 102. The account information 626 may be stored on one or both of the audio enabled device(s) 102 and the distributed computing device(s) 210.

At 1208, a determination is made whether the audio enabled device 102(2) is configured to provide an audio output function, an audio input function, or both an audio output and audio input function. In some cases, the determination of the supported functions of the audio enabled device 102(2) may be based on the identification of the audio enabled device 102(2) included in the signal. The audio enabled device 102(1) may make the determination by accessing the device capability information 628 that describes supported functions for particular audio enabled devices 102, or for particular types of audio enabled devices 102. The device capability information 628 may be stored on one or both of the audio enabled device(s) 102 and the distributed computing device(s) 210. In some implementations, the signal may include information describing the supported functions of the audio enabled device 102(2).

At 1210, a determination may be made of a location of the audio enabled device 102(2) relative to the audio enabled device 102(1), such as a distance or direction of the audio enabled device 102(2) from the audio enabled device 102(1). In some cases, the determination of the location may include determining locations of the audio enabled devices 102(1) and 102(2) within a house or other building, such as the rooms in which the audio enabled devices 102(1) and 102(2) are located. The location determination at 1210 may be based on location information 1212, which may include one or more of the following.

The location information 1212 may include data describing the strength, the direction, or both the strength and direction of the signal received at 1202. In some cases, the detection of the signal may itself indicate that the audio enabled devices 102(1) and 102(2) are within a predetermined distance of one another, based on the strength of the signal as transmitted (e.g., the original signal strength) and based on a predicted degradation of the signal strength over distance. For example, based on the strength of the signal as transmitted and based on properties of signal degradation for the particular type of signal, a distance between the audio enabled devices 102(1) and 102(2) may be calculated. The calculated distance may then be compared to the predetermined threshold distance to determine whether the audio enabled devices 102(1) and 102(2) may be included in the same device set 108. In some cases, the location information 1212 may also include information describing a time when the signal was transmitted. In such cases, a distance between the audio enabled devices 102(1) and 102(2) may be calculated as a product of the time of flight of the signal (e.g., the time difference between the transmission time and the receipt time of the signal) and the speed of the signal.

The location information 1212 may include data from a satellite-based navigation system such as a GPS system, or data from another signal-based location determination technique such as geolocation based on cell tower locations, wireless network signals, and so forth.

The location information 1212 may include geolocation data based on the IP addresses of the audio enabled devices 102(1) and 102(2). For example, the IP addresses may indicate that the audio enabled devices 102(1) and 102(2) are within a same house or other building assigned a particular range of IP addresses.

The location information 1212 may include audio-location data determined by measuring audio signal strength, direction, or both strength and direction. For example, one of the audio enabled devices 102(1) and 102(2) may emit a sound that is detected by the other. Based on the detected loudness and direction of the sound, and knowing the loudness of the originally emitted sound, an estimate may be made of the distance and direction between the audio enabled devices 102(1) and 102(2).

The location information 1212 may also include user-provided location information. In some implementations, the user 106 may provide information indicating a location of the audio enabled devices 102(1) and 102(2), such as the location of the audio enabled devices 102(1) and 102(2) in various rooms of the user's home. In some cases, the user 106 may employ a configuration wizard or other software executing on a user device, to specify the locations of the various audio enabled devices 102 that have been detected in the environment. For example, each audio enabled device 102 may be instructed to emit a sound, and the user 106 may be asked to describe its location (e.g., living room, bedroom, kitchen, etc.) Alternatively, the user 106 may carry a mobile user device (e.g., tablet, smartphone, etc.) to each of the audio enabled devices 102 in their environment, and the configuration software executing on the mobile user device may prompt the user 106 to describe the location of the nearby audio enabled device 102. In some implementations, the location for an audio enabled device 102 may be specified by the user 106 when the user 106 purchases or otherwise acquires the audio enabled device 102. For example, the user 106 may purchase a set top box through an online store and may be prompted to input the intended location of the set top box in the user's home. Other types of location information 1212 may also be used to determine the location of the audio enabled devices 102(1) and 102(2) at 1210. The process may proceed as described with reference to FIG. 13.

At 1302, based on the location(s) determined at 1210, a determination is made whether the audio enabled devices 102(1) and 102(2) are within a predetermined threshold distance of each other (e.g., within ten meters) or at a common location (e.g., in the same house, apartment, and so forth). If not, the process may proceed to 1304 and continue monitoring for signals from audio enabled devices 102. If so, the process may proceed to 1306.

In some implementations, the determination that the audio enabled devices 102(1) and 102(2) are within a predetermined threshold distance may be based on the ability of the audio enabled device 102(1) to receive the signal transmitted by the audio enabled device 102(2). For example, the audio enabled device 102(1) may have access to information regarding the power and frequency at which the audio enabled device 102(2) transmitted the signal, as in cases where the signal complies with a version of the IEEE 802.11 standard for wireless networking. The predetermined threshold distance may be the maximum distance over which a signal having that power and frequency may be detected, e.g., the range of a signal having that power and frequency.

At 1306, a device set 108 may be designated that includes the audio enabled devices 102(1) and 102(2). The device set 108 may enable shared functionality between the audio enabled devices 102(1) and 102(2), as described further with reference to FIGS. 14-17. In some implementations, the device set 108 may be employed to authorize the shared functionality between the audio enabled devices 102(1) and 102(2). For example, the audio enabled device 102(1) may be authorized to control the audio output on the audio enabled device 102(2) if the audio enabled devices 102(1) and 102(2) are both included in the device set 108. As described with reference to FIGS. 8-11, the device set 108 may be arranged according to one or more of device location, supported device functions, or associated users. For example, a device set 108 may include audio enabled devices 102 located in the "living room", audio enabled devices 102 that support audio output, or audio enabled devices 102 that are associated with the user 106 "Martine". The designation of the device set 108 at 1306 may include determining the device set information 624 that describes the device set 108 as including the audio enabled devices 102(1) and 102(2). In some cases, the designation may include generating the device set information 624 for a device set 108 that is not currently designated (e.g., generating new device set information 624). Alternatively, the designation may include modifying previously generated device set information 624 to incorporate the audio enabled devices 102(1) and 102(2) into a previously designated device set 108.

The device set 108 may enable shared functionality between the audio enabled devices 102(1) and 102(2). Such shared functionality may include controlling the audio output function of an audio enabled device 102 in the device set 108, based on voice command(s) 110 received at another audio enabled device 102 in the device set 108. The shared functionality may include shared playback of audio content using audio output functions of multiple audio enabled devices 102 in the device set 108, the shared playback being in parallel (e.g., as substantially synchronized playback) or using a different set of audio enabled device(s) 102 at a time.

At 1308, the device set 108 may be described in the device set information 624, which may be stored in memory on one or more of the audio enabled device 102(1), the audio enabled device 102(2), or the distributed computing device(s) 210. At 1310, the process may continue monitoring for signals from audio enabled devices 102.

In some implementations, the determination of one or more device sets 108 may be at least partly automated, based on the locations, user associations, and functionality of the audio enabled devices 102. In some implementations, the determination of the device set(s) 108 may be based at least partly on input from one or more users 106 provided through configuration software executing on a user device. For example, based on a determination that a set top box is in the same room with one or more audio output devices, the configuration software may suggest that the audio output devices be grouped with the set top box in a device set 108 with the device set description 802 "home theater". Such a device set 108 may enable the set top box to share audio output functionality with the audio output devices, providing a richer home theater experience. Moreover, in some cases the recommendation of audio enabled devices 102 to group into a device set 108 may be based on sales data, delivery data, or other information regarding the user's past purchases or activities. For example, based on sales data indicating that the user 106 previously purchased audio output devices, a set top box, a television, or other components of a home theater system, the configuration software may recommend that the user 106 specify a device set 108 with device set description 802 "home theater".

Figure 14:
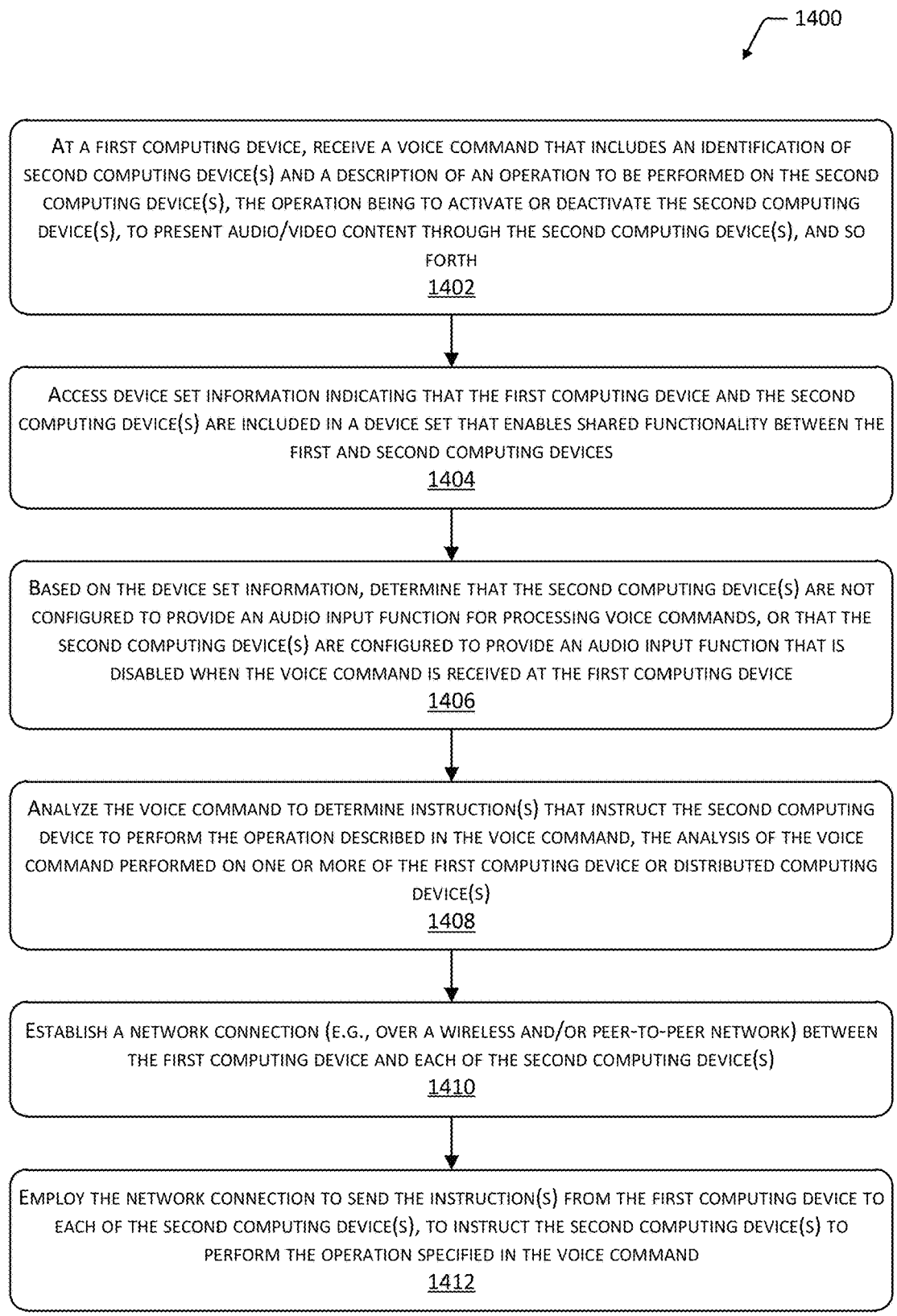
FIG. 14 depicts a flow diagram of a process for employing a voice command received at a first computing device to control one or more operations of a second computing device, in cases where the second computing device is not capable of processing voice commands.

FIG. 14 depicts a flow diagram 1400 of a process for employing a voice command 110 received at a first audio enabled device 102(1) to control one or more operations of one or more second audio enabled devices 102(2). One or more operations of the process may be performed by the voice command processing module 202, the speech recognition module 204, the content retrieval module 208, the audio output module 216, or by other modules executing on the audio enabled device(s) 102, the distributed computing device(s) 210, or other devices.

At 1402, a voice command 110 is received at a first audio enabled device 102(1). The voice command 110 may include an identification of the second audio enabled device(s) 102(2). The voice command 110 may also include a description of an operation to be performed on the audio enabled device(s) 102(2). In some cases, the operation may be to present audio content, video content, or other types of content using content presentation capabilities of the audio enabled device(s) 102(2). Implementations also support other types of operations, such as operations to deactivate (e.g., power off, suspend, or put to sleep) or activate (e.g., power on, or wake up) the audio enabled device(s) 102(2).

At 1404 device set information 624 is accessed, the device set information 624 indicating that the audio enabled devices 102(1) and 102(2) are included in a same device set 108 that enables or authorizes shared functionality between the audio enabled devices 102(1) and 102(2). In some implementations, the device set may enable shared audio functionality that includes shared audio output between multiple audio enabled devices, such that the same audio output is played in parallel on multiple audio enabled devices or played at different times on different audio enabled devices. In such cases, a voice command may identify a device set on which audio content is to be played (e.g., "play favorite songs in living room"). Device set information may then be accessed to determine the audio enabled devices that are included in the identified device set (e.g., living room audio playback devices), and the requested audio content may be played on the audio enabled devices of the device set. A device set may also enable shared audio functionality that includes shared audio input, such that a voice command or other audio input received at a receiving audio enabled device may be employed to control audio output or other operations performed by one or more target devices. For example, a voice command "play random classical music in the bedroom" may be received and processed by an audio enabled device in a different room (e.g., the living room). The audio enabled device that receives the voice command may then cause the specified device set (e.g., bedroom audio playback devices) to play the specified audio content.

In some implementations, a device set may determine whether shared functionality is authorized between devices. For example, a voice command may be received at a first audio enabled device, the voice command specifying audio content to be played on a second audio enabled device. If the first and second audio enabled devices are included in the same device set, the first audio enabled device may send one or more instructions to the second audio enabled device to instruct the second audio enabled device to play the requested audio content.

At 1406, based on the supported function(s) 812 listed in the device set information 624 for the audio enabled device(s) 102(2), a determination may be made that the audio enabled device(s) 102(2) are not configured to provide an audio input function for receiving and processing voice command(s) 110. Alternatively, the device set information 624 may indicate that the audio enabled device(s) 102(2) are configured to provide an audio input function that is disabled at a time when the voice command 110 is received at the audio enabled device 102(1). For example, the audio enabled device 102(2) may be asleep or otherwise in a state of suspended operations when the voice command 110 is received. Alternatively, the audio enabled device 102(2) may be a clutched device that is configured to accept voice commands 110 while a user 106 is pressing a button on the audio enabled device 102(2) or is otherwise manipulating the audio enabled device 102(2). In such cases, the voice command 110 may be received while the user 106 is not pressing the button on the audio enabled device 102(2).

At 1408, the voice command 110 may be analyzed to determine the instruction(s) 112 that instruct the audio enabled device 102(2) to perform the operation(s) described in the voice command 110. The analysis of the voice command 110 may be performed on one or more of the audio enabled device 102(1) or the distributed computing device(s) 210.

In some cases, multiple audio enabled devices 102 may receive the same voice command 110. In such cases, the audio enabled devices 102 may each record the voice command 110 and send the recordings of the voice command 110 to a designated (e.g., master) audio enabled device 102. The designated audio enabled device 102 may compare the various recordings of the voice command 110 and determine which recording exhibits the highest quality with regard to completeness, sound quality, fidelity, or other characteristics. The highest quality recording may then be analyzed on the designated audio enabled device 102, or on the distributed computing device(s) 210, to determine the instruction(s) 112.

At 1410, a network connection may be established between the audio enabled device 102(1) and each of the audio enabled device(s) 102(2). In some implementations, the network connection may be a wireless peer-to-peer connection between the audio enabled device 102(1) and each of the audio enabled device(s) 102(2).

At 1412, the network connection(s) may be employed to send the instruction(s) 112 from the audio enabled device 102(1) to each of the audio enabled device(s) 102(2), to instruct each of the audio enabled device(s) 102(2) to perform the operation(s) specified in the voice command 110. In some cases, a peer-to-peer network may have been previously established between the audio enabled device 102(1) and each of the audio enabled device(s) 102(2). In such cases, the previously established network(s) may be employed at 1412 instead of establishing new network connection(s) at 1410.

By employing the device set 108 to designate shared functionality between the audio enabled devices 102(1) and 102(2), implementations enable the control of the audio enabled device(s) 102(2) through voice command(s) 110 while the audio input function of the audio enabled device 102(2) is disabled or otherwise unavailable. Moreover, implementations enable the extension of the audio input function to devices that may not otherwise support an audio input function, by grouping devices of different capabilities into a device set 108.

Figure 15:
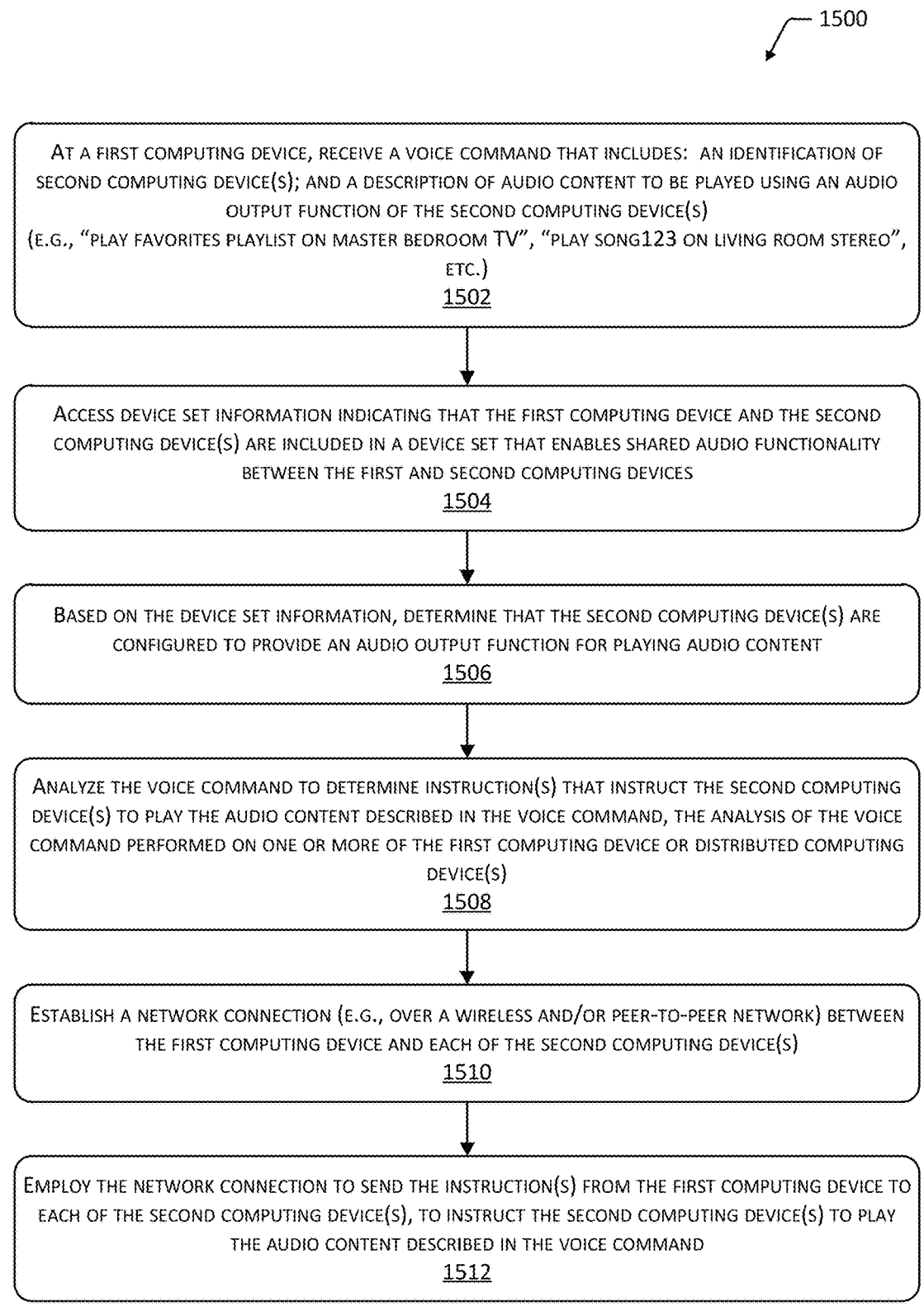
FIG. 15 depicts a flow diagram of a process for employing a voice command received at a first computing device to play audio content on one or more second computing devices.

FIG. 15 depicts a flow diagram 1500 of a process for employing a voice command received at a first computing device to play audio content on one or more second computing devices. One or more operations of the process may be performed by the voice command processing module 202, the speech recognition module 204, the content retrieval module 208, the audio output module 216, or by other modules executing on the audio enabled device(s) 102, the distributed computing device(s) 210, or other devices.

At 1502, a voice command 110 is received at a first audio enabled device 102(1). The voice command 110 may include an identification of second audio enabled device(s) 102(2), and a description of audio content to be played using an audio output function of the audio enabled device(s) 102(2).

At 1504 device set information 624 is accessed, the device set information 624 indicating that the audio enabled devices 102(1) and 102(2) are included in a same device set 108 that enables shared functionality between the audio enabled devices 102(1) and 102(2).

At 1506, based on the device set information 624 a determination may be made that the audio enabled device(s) 102(2) are configured to provide an audio output function for playing audio content.

At 1508, the voice command 110 may be analyzed to determine the instruction(s) 112 that instruct the audio enabled device 102(2) to play the audio content described in the voice command 110. The analysis of the voice command 110 may be performed on one or more of the audio enabled device 102(1) or the distributed computing device(s) 210.

At 1510, a network connection may be established between the audio enabled device 102(1) and each of the audio enabled device(s) 102(2). In some implementations, the network connection may be a wireless peer-to-peer connection between the audio enabled device 102(1) and each of the audio enabled device(s) 102(2).

At 1512, the network connection(s) may be employed to send the instruction(s) 112 from the audio enabled device 102(1) to each of the audio enabled device(s) 102(2), to instruct each of the audio enabled device(s) 102(2) to play the audio output specified in the voice command 110. In some cases, a peer-to-peer network may have been previously established between the audio enabled device 102(1) and each of the audio enabled device(s) 102(2). In such cases, the previously established network(s) may be employed at 1512 instead of establishing new network connection(s) at 1510.

Figure 16:
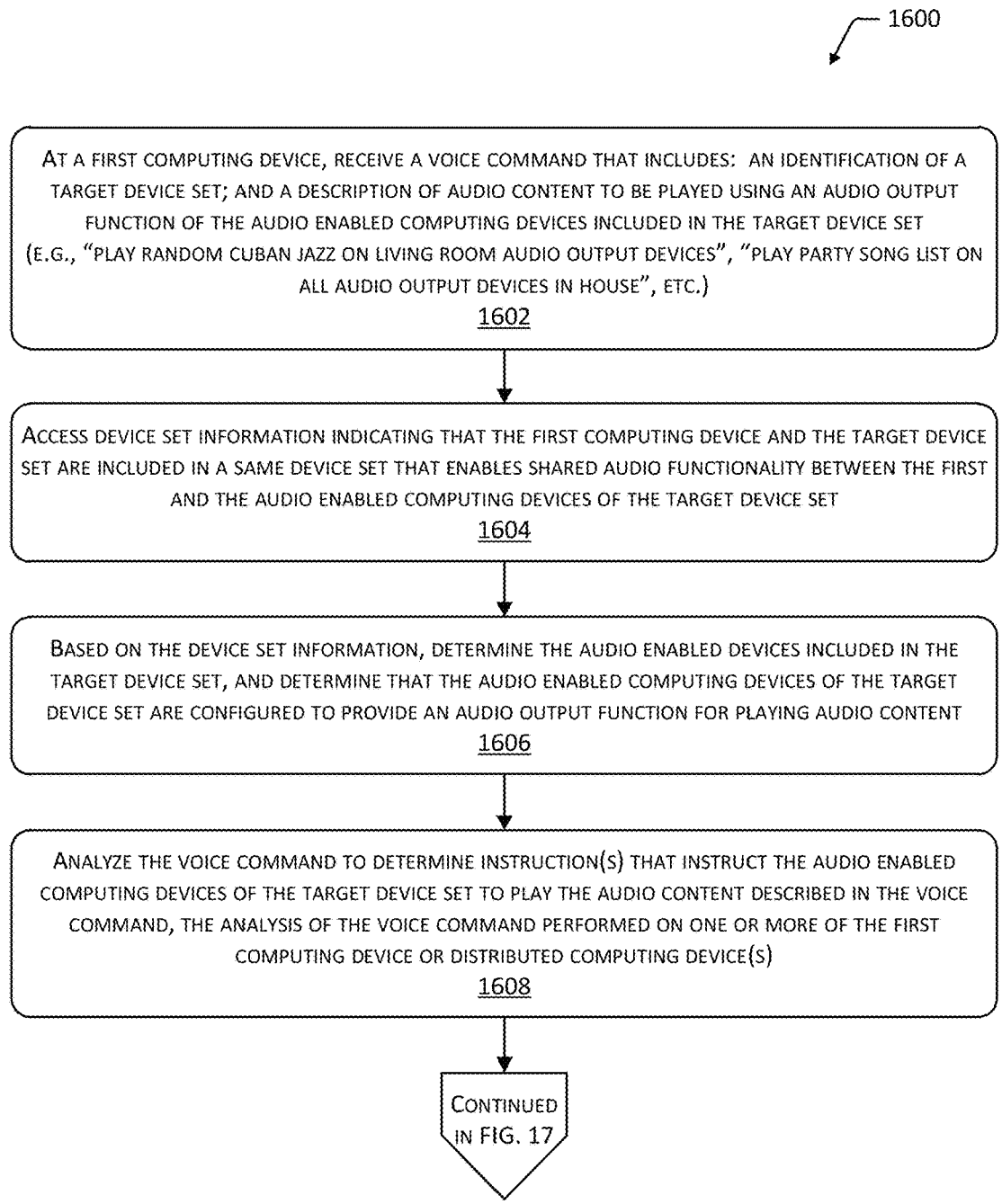
FIG. 16 depicts a flow diagram of a process for employing a voice command received at a first computing device to synchronously play audio content on a plurality of audio enabled devices included in a target device set.
Figure 17:
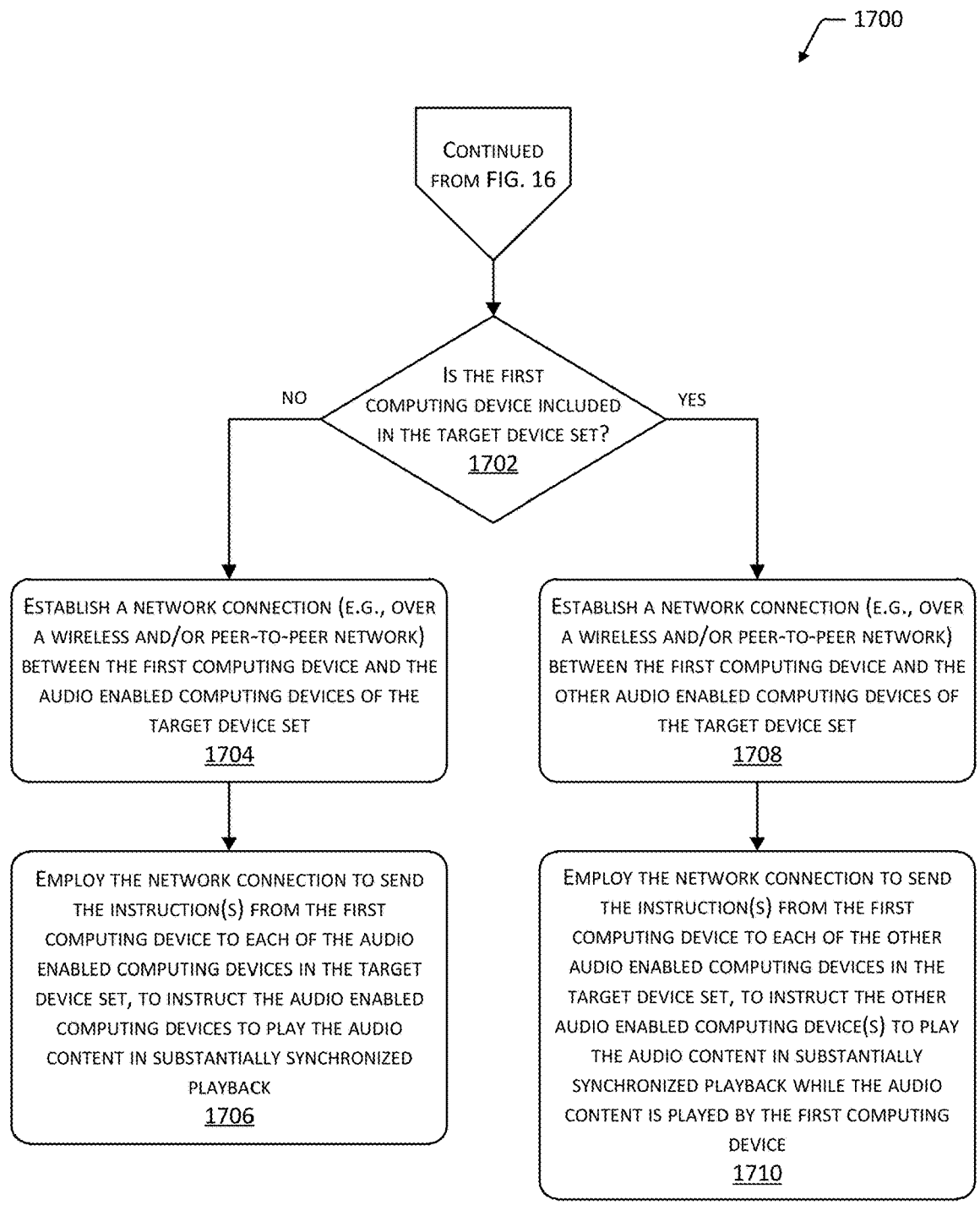
FIG. 17 depicts a flow diagram of a process for employing a voice command received at a first computing device to synchronously play audio content on a plurality of audio enabled devices included in a target device, in cases where the device set includes or does not include the first computing device.

FIGS. 16 and 17 depict flow diagrams 1600 and 1700 of a process for employing a voice command 110 received at a first audio enabled device 102(1) to synchronously play audio content on a plurality of target audio enabled devices 102 included in a target device set 108. One or more operations of the process may be performed by the voice command processing module 202, the speech recognition module 204, the content retrieval module 208, the audio output module 216, or by other modules executing on the audio enabled device(s) 102, the distributed computing device(s) 210, or other devices.

At 1602, a voice command 110 is received at a receiving audio enabled device 102(1). The voice command 110 may include an identification of a target device set 108 and a description of audio content to be played using an audio output function of the audio enabled devices 102 included in the target device set 108.

At 1604 device set information 624 is accessed, the device set information 624 indicating that the audio enabled device 102(1) and the target device set 108 are included in a same device set 108 that enables shared functionality between the audio enabled device 102(1) and the audio enabled devices 102 of the target device set 108.

At 1606, based on the device set information 624 a determination is made of the audio enabled devices 102 that are included in the target device set 108. A determination may also be made that the audio enabled devices 102 of the target device set 108 are configured to provide an audio output function for playing audio content.

At 1608, the voice command 110 may be analyzed to determine the instruction(s) 112 that instruct the audio enabled devices 102 of the target device set 108 to play the audio content described in the voice command 110. The analysis of the voice command 110 may be performed on one or more of the audio enabled device 102(1) or the distributed computing device(s) 210.

With reference to FIG. 17, at 1702 a determination may be made whether the receiving audio enabled device 102(1) is included in the target device set 108. If not, the process may proceed to 1704. If so, the process may proceed to 1708.

At 1704, a network connection may be established between the receiving audio enabled device 102(1) and each of the audio enabled devices 102 in the target device set 108. In some implementations, the network connection may be a wireless peer-to-peer connection between the audio enabled device 102(1) and each of the audio enabled devices 102 in the target device set 108.

At 1706, the network connection(s) established at 1704 may be employed to send the instruction(s) 112 from the receiving audio enabled device 102(1) to each of the audio enabled devices 102 in the target device set 108, to instruct each of the audio enabled devices 102 to play the audio output specified in the voice command 110. In some cases, the audio enabled devices 102 may be instructed to play the audio content in parallel (e.g., simultaneously, or in a substantially synchronized playback).

At 1708, a network connection may be established between the receiving audio enabled device 102(1) and each of the other audio enabled devices 102 in the target device set 108. In some implementations, the network connection may be a wireless peer-to-peer connection between the audio enabled device 102(1) and each of the other audio enabled devices 102 in the target device set 108.

At 1710, the network connection(s) established at 1708 may be employed to send the instruction(s) 112 from the receiving audio enabled device 102(1) to each of the other audio enabled devices 102 in the target device set 108, to instruct each of the audio enabled devices 102 to play the audio output specified in the voice command 110. In some cases, the audio enabled devices 102 may be instructed to play the audio content in parallel (e.g., simultaneously, or in a substantially synchronized playback) while the audio content is played by the receiving audio enabled device 102(1).

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. For example, although the examples herein described using a device set 108 to enable shared audio functionality between audio enabled devices 102, implementations may be similarly used to enable shared functionality for video or graphics presentation on multiple devices, shared interactive game play across multiple devices, and so forth. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method comprising:
receiving, at a first computing device, a voice command to output audio content using a target device set;
determining the target device set comprises a second computing device and a third computing device;
determining the first computing device, the second computing device, and the third computing device are included in a second device set that enables shared audio functionality among the first computing device, the second computing device, and the third computing device;
receiving the audio content to be outputted by the second computing device and the third computing device; and
sending, over a network to the second computing device and the third computing device, a command to output the audio content by the second computing device within a period of time as when the third computing device outputs the audio content.

2. The method of claim 1, further comprising:
storing the audio content; and
sending the audio content to the second computing device and the third computing device using the network, wherein the network comprises a wireless peer-to-peer network.

3. The method of claim 1, further comprising:
receiving the audio content to be outputted from a fourth computing device; and
sending the audio content to the second computing device and the third computing device using the network, wherein the network comprises a wireless peer-to-peer network.

4. The method of claim 1, further comprising:
outputting the audio content using an audio output function of the second computing device and the third computing device substantially synchronized based on synchronization of a first clock of the second computing device to a second clock of the third computing device.

5. The method of claim 1, further comprising:
accessing a section of device set information delineated by a first set of one or more metadata tags, the first set of one or more metadata tags describing functions of the second computing device and the third computing device selected from the target device set to present the audio content.

6. A system comprising:
a microphone;
one or more memories storing computer-executable instructions; and
one or more hardware processors configured to execute the computer-executable instructions to:
receive, at a first computing device, a voice command from the microphone;
identify a target device set;
determine the target device set comprises a second computing device and a third computing device;
determine the first computing device, the second computing device, and the third computing device are included in a second device set that enables shared audio functionality among the first computing device, the second computing device, and the third computing device;
receive audio content to be outputted by the second computing device and the third computing device; and
send, over a network to the second computing device and the third computing device, a command to output the audio content by the second computing device within a period of time as when the third computing device outputs the audio content.

7. The system of claim 6, wherein the audio content is received from a content service.

8. The system of claim 6, wherein the audio content is received from a fourth computing device.

9. The system of claim 6, wherein the network comprises a wireless peer-to-peer network.

10. The system of claim 6, wherein:
device set information includes a section associated with the target device set, the section delineated by a first set of one or more metadata tags; and
the section associated with the target device set includes a second set of one or more metadata tags that describes functions of the second computing device and the third computing device to present the audio content.

11. The system of claim 10, wherein one or more metadata tags in the second set of one or more metadata tags include an attribute indicating one or more audio output functions of the second computing device and the third computing device.

12. The system of claim 6, the one or more hardware processors further configured to execute the computer-executable instructions to:
perform speech recognition to determine an utterance included in the voice command, the utterance including a description of the audio content to be presented; and
wherein the voice command is determined using the utterance.

13. The system of claim 6, wherein the one or more hardware processors are further configured to execute the computer-executable instructions to send a request for the audio content.

14. One or more non-transitory computer-readable media storing instructions which, when executed by at least one processor of one or more servers, instruct the at least one processor to perform actions comprising:
receiving, at a first computing device, a voice command to output audio content using a target device set;
determining the target device set comprises the first computing device and a second computing device;
determining the first computing device and the second computing device are included in a second device set that enables shared audio functionality among the first computing device and the second computing device;
receiving the audio content to be outputted by the first computing device and the second computing device; and
sending, over a network to the second computing device, a command to output the audio content by the second computing device within a period of time as when the first computing device outputs the audio content.

15. The one or more non-transitory computer-readable media of claim 14, further storing instructions, which when executed by the at least one processor of the one or more servers, instruct the at least one processor to perform actions comprising:
receiving the audio content from one or more of a content service or a third computing device.

16. The one or more non-transitory computer-readable media of claim 14, further storing instructions, which when executed by the at least one processor of the one or more servers, instruct the at least one processor to perform actions comprising:
outputting the audio content using an audio output function of the second computing device and the first computing device substantially synchronized based on synchronization of a first clock of the first computing device to a second clock of the second computing device.

17. The one or more non-transitory computer-readable media of claim 14, further storing instructions which, when executed by the at least one processor of the one or more servers, instruct the at least one processor to perform actions comprising:
accessing a section of device set information delineated by a first set of one or more metadata tags, the first set of the one or more metadata tags describing functions of the second computing device.

18. The one or more non-transitory computer-readable media of claim 14, wherein the first computing device and the second computing device present the audio content serially, such that the first computing device and the second computing device present the audio content during non-overlapping time periods.

19. The one or more non-transitory computer-readable media of claim 14, further storing instructions which, when executed by the at least one processor of the one or more servers, instruct the at least one processor to perform actions comprising:
sending a request for the audio content.

20. The one or more non-transitory computer-readable media of claim 14, further storing instructions which, when executed by the at least one processor of the one or more servers, instruct the at least one processor to perform the actions comprising:

performing speech recognition to determine an utterance included in the voice command, the utterance including a description of the audio content to be presented; and wherein the voice command is determined using the utterance.

\* \* \* \* \*